US011710390B2

(12) United States Patent
Mahmoud et al.

(10) Patent No.: US 11,710,390 B2
(45) Date of Patent: **\*Jul. 25, 2023**

(54) EVENT STATISTIC GENERATION METHOD AND APPARATUS FOR INTRUSION DETECTION

(71) Applicant: AVA RISK GROUP LIMITED, Mulgrave (AU)

(72) Inventors: Seedahmed Mahmoud, Dandenong (AU); Alaster Meehan, Upwey (AU); Brian Bourke, Brighton (AU)

(73) Assignee: AVA RISK GROUP LIMITED, Mulgrave (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,813

(22) Filed: Jun. 3, 2022

(65) Prior Publication Data

US 2022/0309888 A1 Sep. 29, 2022

Related U.S. Application Data

(63) Continuation of application No. 17/045,590, filed as application No. PCT/AU2019/050303 on Apr. 5, 2019, now Pat. No. 11,373,493.

(30) Foreign Application Priority Data

Apr. 6, 2018 (AU) ............................. 2018901143

(51) Int. Cl.
*G08B 13/14* (2006.01)
*G01D 5/353* (2006.01)
*G08B 13/187* (2006.01)
*H04B 10/071* (2013.01)

(52) U.S. Cl.
CPC ..... *G08B 13/1481* (2013.01); *G01D 5/35358* (2013.01); *G08B 13/187* (2013.01); *H04B 10/071* (2013.01)

(58) Field of Classification Search
CPC ............... G08B 13/187; H04B 10/071; G01D 5/35358; G01D 5/35361; G01M 11/319; G08C 23/06
See application file for complete search history.

(56) References Cited

U.S. PATENT DOCUMENTS

| 2009/0080898 A1* | 3/2009 | Anderson ............ G08C 23/06 398/140 |
| 2009/0201146 A1* | 8/2009 | Lundeberg ......... G08B 13/1436 340/539.3 |

(Continued)

FOREIGN PATENT DOCUMENTS

| CN | 107369282 A | 11/2017 |
| EP | 2097880 A1 | 9/2009 |

(Continued)

OTHER PUBLICATIONS

European Patent Office Extended Search Report for Application No. 19781013.8 dated Apr. 30, 2021 (14 pages).

(Continued)

*Primary Examiner* — Mirza F Alam
(74) *Attorney, Agent, or Firm* — Michael Best & Friedrich LLP

(57) ABSTRACT

A computer-implemented event statistic generation method for intrusion detection comprises processing a plurality of return signals from a coherent optical time domain reflectometer into time domain signals for each of a plurality of sensor bins, the plurality of return signals corresponding to a plurality of stimulation pulses injected into an optical sensor fiber during a time period. For each sensor bin, the method comprises transforming the respective time-domain signal into a corresponding frequency-domain signal, calculating, from the respective frequency-domain signal, a first signal power area of a first frequency band expected to contain system noise, calculating, from the respective fre- (Continued)

quency-domain signal, a second signal power area of a second frequency band expected to contain any energy related to at least a first event; and generating an event statistic proportional to the ratio of the second signal power area to the first signal power area at least in part by dividing the second signal power area by the first signal power area.

20 Claims, 23 Drawing Sheets

(56) References Cited

U.S. PATENT DOCUMENTS

| | | | |
|---|---|---|---|
| 2010/0085188 A1* | 4/2010 | Herdic | G08B 13/1663 340/566 |
| 2011/0169638 A1* | 7/2011 | Krumhansl | G01V 1/001 340/566 |
| 2017/0260839 A1 | 9/2017 | Beardmore et al. | |

FOREIGN PATENT DOCUMENTS

| | | |
|---|---|---|
| GB | 2539254 A | 12/2016 |
| WO | 2010090752 A1 | 8/2010 |
| WO | 2011006210 A1 | 1/2011 |
| WO | 2016033199 A1 | 3/2016 |

OTHER PUBLICATIONS

International Search Report and Written Opinion for Application No. PCT/AU2019/050303 dated May 20, 2019 (9 pages).

International Preliminary Report on Patentability for Application No. PCT/AU2019/050303 dated Apr. 16, 2020 (4 pages).

"Ren, M., ""Distributed Optical Fiber Vibration Sensor Based on Phase-Sensitive Optical Time Domain Reflectometry"", Thesis submitted to the Faculty of Graduate and Postdoctoral Studies in partial fulfillment of the requirements for theM Sc. degree in Physics, Ottawa-Carleton Institute for Physics, University of Ottawa, 2016, 85 pages."

* cited by examiner

EVENT STATISTIC GENERATION METHOD AND APPARATUS FOR INTRUSION DETECTION

FIELD

The invention relates to a computer-implemented event statistic generation method and an event statistic generation apparatus for intrusion detection.

BACKGROUND

One of the challenges of all sensing systems is to be able to operate in a number of hostile environments. Intrusion detection systems which are often installed in outdoor environments are no exception. These systems often need to operate during periods of heavy wind or rain, or close to nearby traffic carriageways or other non-intrusion related disturbances.

Some intrusion detection systems use Coherent Optical Time Domain Reflectometer (COTDR) technology to obtain signals from a buried optical fiber. Most buried COTDR fiber-optic intrusion detection systems operate close to sources of nuisance alarms which can typically include traffic from road or railway crossings, as well as nearby excavation equipment. The effectiveness of such an intrusion detection system depends on how well it can suppress any alarms caused by these nuisance events.

SUMMARY OF THE INVENTION

An embodiment of the present invention provides a computer-implemented event statistic generation method for intrusion detection comprising:
processing a plurality of return signals from a coherent optical time domain reflectometer into time domain signals for each of a plurality of sensor bins, the plurality of return signals corresponding to a plurality of stimulation pulses injected into an optical sensor fiber during a time period; and
for each sensor bin:
transforming the respective time-domain signal into a corresponding frequency-domain signal;
calculating, from the respective frequency-domain signal, a first signal power area of a first frequency band expected to contain system noise;
calculating, from the frequency-domain signal, a second signal power area of a second frequency band expected to contain any energy related to at least a first event; and
generating an event statistic proportional to the ratio of the second signal power area to the first signal power area at least in part by dividing the second signal power area by the first signal power area.

In an embodiment, the method comprises processing a plurality of return signals for each of a plurality of time periods to obtain, for each sensor bin, a plurality of event statistics.

In an embodiment, the method comprises converting each event statistic to a visual representation indicative of the relative size of the event statistic an outputting a matrix of the respective visual representations on a display.

In an embodiment, each visual representation is a grey-scale value.

In an embodiment, each visual representation is a colour-scale value.

In an embodiment, generating an event statistic comprises applying a scaling factor derived from the number of frequency bins in the first and second frequency band.

In an embodiment, the method comprises calculating, from the frequency-domain signal, a third signal power area of a third frequency band expected to contain any energy related to at least a second event, and generating a further event statistic proportional to the ratio of the third signal power area to the first signal power area at least in part by dividing the third signal power area by the first signal power area.

In another embodiment there is provided an event statistic generation apparatus comprising:
a processor; and
a memory storing instructions which when executed by the processor, cause the processor to:
process a plurality of return signals from a coherent optical time domain reflectometer into time domain signals for each of a plurality of sensor bins, the plurality of return signals corresponding to a plurality of stimulation pulses injected into an optical sensor fiber during a time period; and
for each sensor bin:
transform the respective time-domain signal into a corresponding frequency-domain signal;
calculate, from the respective frequency-domain signal, a first signal power area of a first frequency band expected to contain system noise;
calculate, from the frequency-domain signal, a second signal power area of a second frequency band expected to contain any energy related to at least a first event; and
generate an event statistic proportional to the ratio of the second signal power area to the first signal power area at least in part by dividing the second signal power area by the first signal power area.

In an embodiment, when the instructions are executed by the processor they cause the processor to process a plurality of return signals for each of a plurality of time periods to obtain, for each sensor bin, a plurality of event statistics.

In an embodiment, when the instructions are executed by the processor they cause the processor to convert each event statistic to a visual representation indicative of the relative size of the event statistic an outputting a matrix of the respective visual representations on a display.

In an embodiment, each visual representation is a grey-scale value.

In an embodiment, each visual representation is a colour-scale value.

In an embodiment, the processor generates an event statistic comprises applying a scaling factor derived from the number of frequency bins in the first and second frequency band.

In an embodiment, when the instructions are executed by the processor they cause the processor to calculate, from the frequency-domain signal, a third signal power area of a third frequency band expected to contain any energy related to at least a second event, and generating a further event statistic proportional to the ratio of the third signal power area to the first signal power area at least in part by dividing the third signal power area by the first signal power area.

In an embodiment, the apparatus comprises the optical fibre sensor and the processor forms part of a controller that implements the coherent optical time domain reflectometer.

Another embodiment provides a computer-implemented intrusion detection method that employs the above event statistic generation method.

BRIEF DESCRIPTION OF THE DRAWINGS

Embodiments of the invention will be described in conjunction with the following drawings in which.

DETAILED DESCRIPTION

Embodiments of the invention provide an event detection method for buried intrusion detection systems. In embodiments of the invention, the intrusion detection system is based on Coherent Optical Time Domain Reflectometer (COTDR) technology. Example embodiments use Fast Fourier Transform (FFT) or Discrete Wavelet Transform (DWT) techniques to convert each location bin (along the sensor) signal from the time domain to the frequency domain and process the frequency domain signal to automatically separate between events and system noise.

Figure 1:
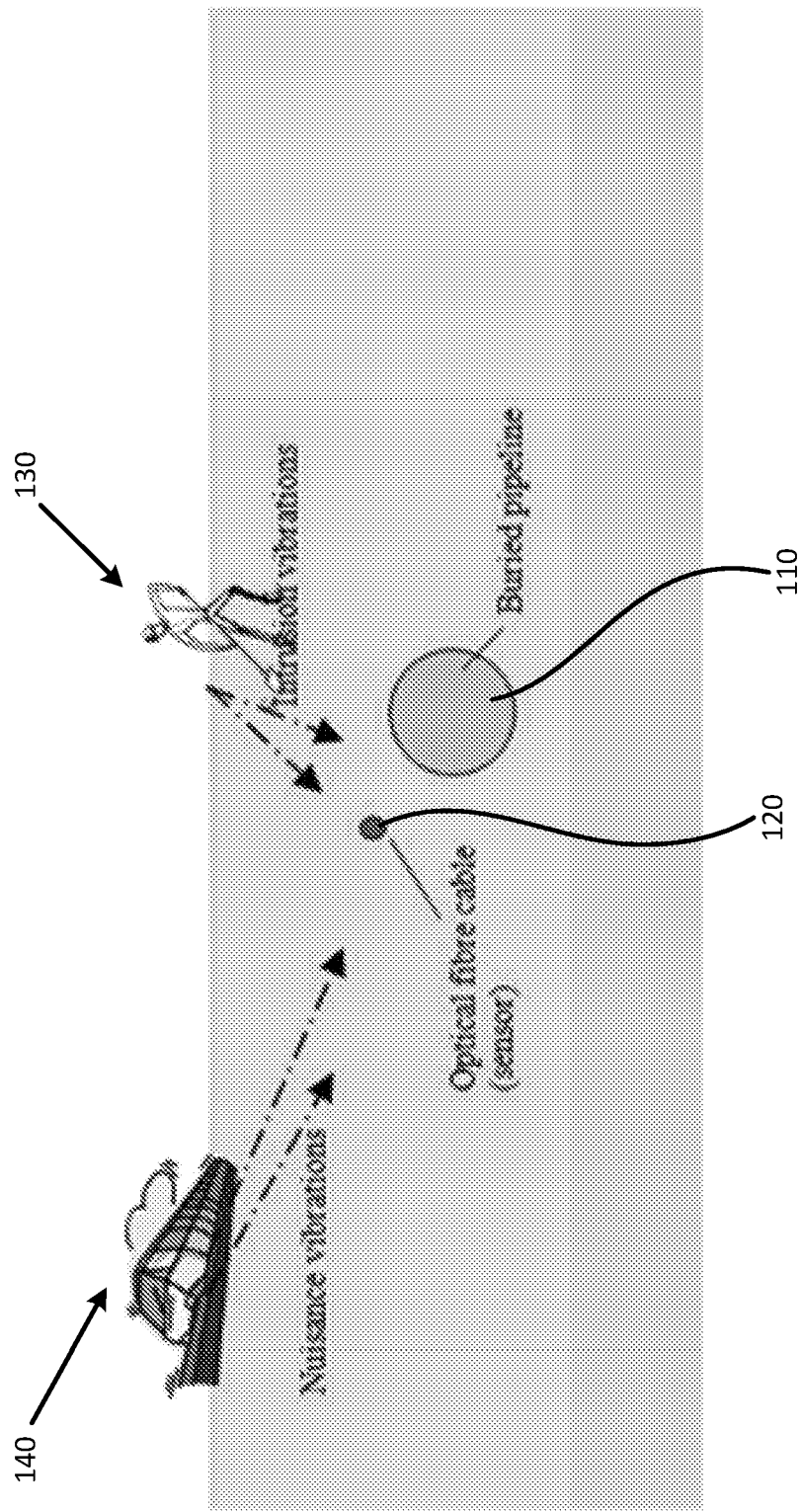
FIG. 1 is a schematic diagram illustrating the need to distinguish between nuisance and intrusion vibrations detected by a covert buried sensor.

FIG. 1 illustrates an example scenario in which embodiments of the invention can be employed. In order to protect a buried pipeline 110 a sensor in the form of an optical fiber cable 120 is buried next to the pipe line. In an example, the cable is buried at a depth of 100 mm to 150 mm. In another example, the cable is buried at a depth of 100 mm to 300 mm.

Figure 2:
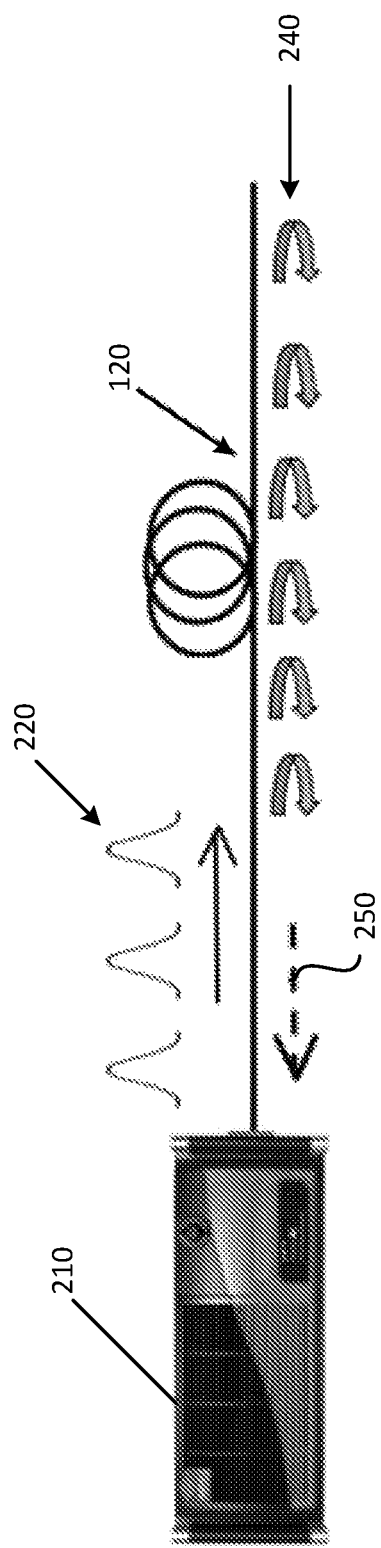
FIG. 2 illustrates an example Coherent Optical Time Domain Reflectometer sensing arrangement.

As shown in FIG. 2, a controller 210, such as the applicant's Aura Ai controller, is used to inject 120 a series of pulses 220 into the optical fiber and to monitor the return light signal 250 caused by Raleigh backscatter 240. By processing the return signal, it is possible to detect changes in the backscatter when a disturbance acts on the optical fiber 120.

In an example, the controller 210 will output optical pulses with a pulse width of 100 ns and peak power of 125 mW at a rate of between 2000-5000 pulses per second. As each pulse propagates along the fiber, the controller 210 samples the backscatter at 200 million times a second (200 MHz), that to get a sample signal 250 for every 0.5 m of length of the cable.

Figure 3:
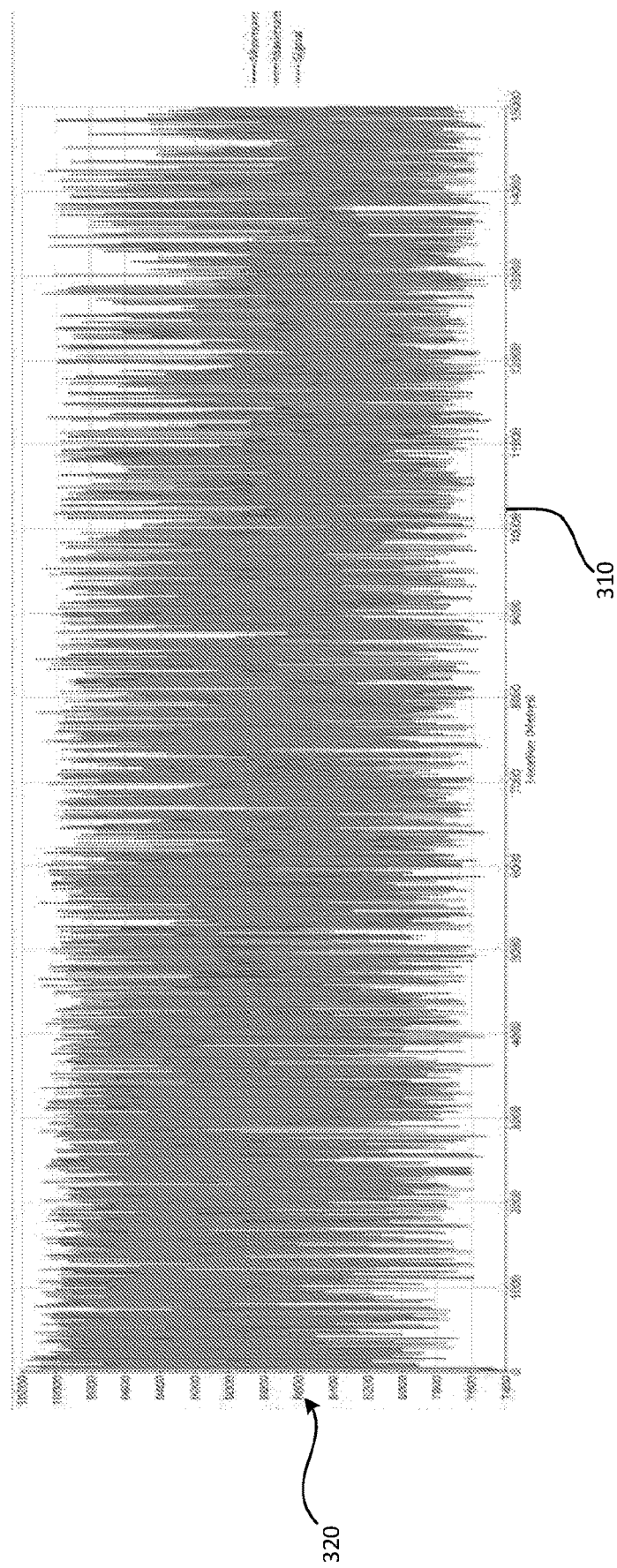
FIG. 3 is an example of raw shot data from the sensing arrangement of FIG. 2

This signal 250 is detected and digitized to construct a raw signal. When a pulse traverses the whole fiber length and the corresponding backscattered signal is received, this is known as a 'shot'. A shot is the interrogation of the fiber sensor by a single pulse. Each shot is divided into 0.5 m sections or sensor 'bins'. An example of a raw shot is shown in FIG. 3 where the horizontal axis 310 is distance in metres and the vertical axis is amplitude in ADC units (ADC=analog to digital converter).

Figure 4:
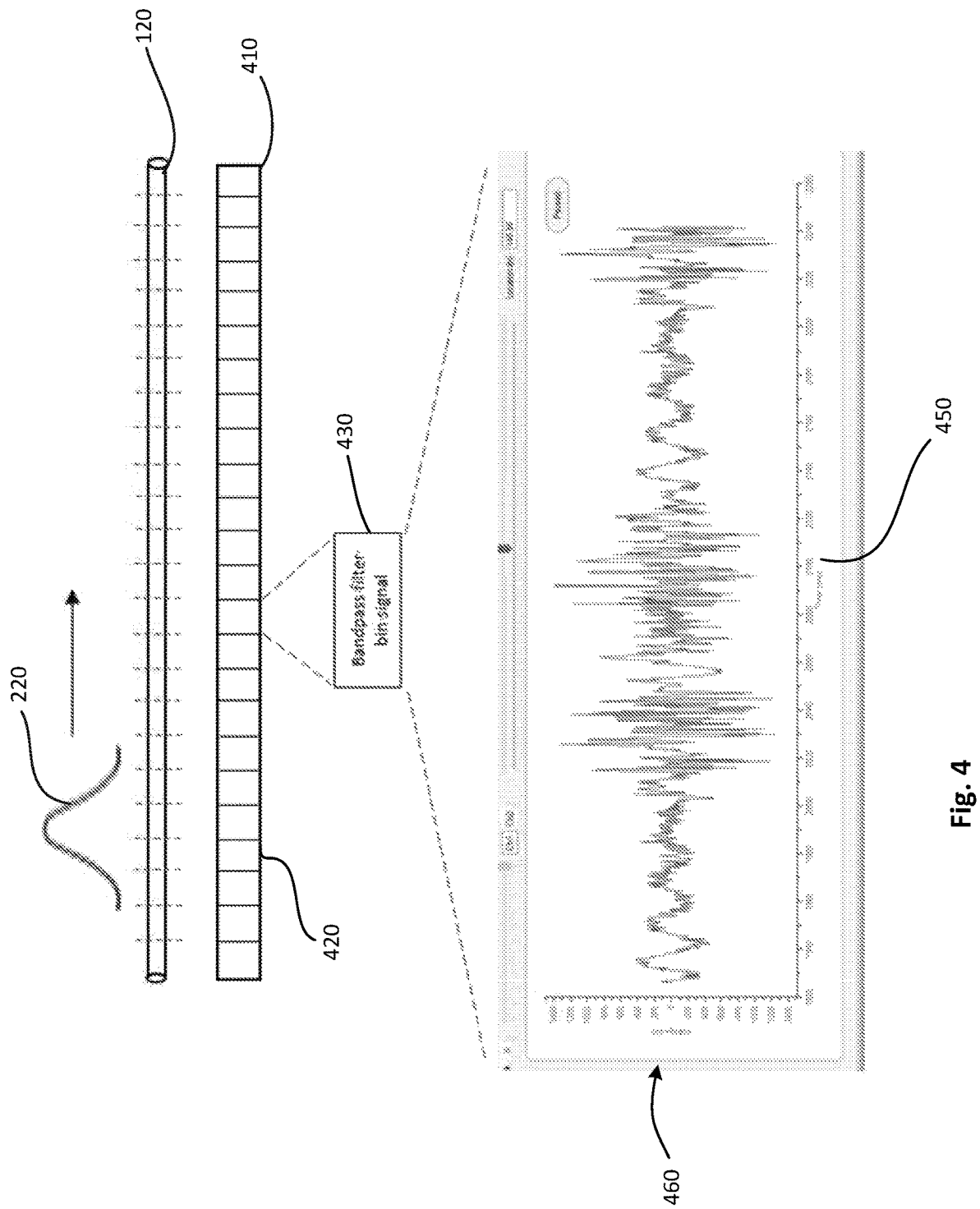
FIG. 4 is a schematic diagram illustrating how the signal of FIG. 3 is filtered.

FIG. 4 is a schematic diagram that illustrates that after the raw signal is created for each bin 420 of the shot 410 by sending pulses 220 along the fiber 120 and measuring the return signal, it is then filtered with a bandpass filter to produce, for each bin, a band pass filtered signal 430 to remove high frequency noise which is present in COTDR signals. The filtered signal 430 looks similar to an interferometric signal. As shown, in FIG. 4, the horizontal axis 450 of the filtered signal 430 is time (ms) and the vertical axis is Voltage (V).

However, while existing controllers can detect some events, other events may be disguised by noise. For example, it may be difficult to distinguish between nuisance vibrations 140 (e.g. from a passing train) and intrusion vibrations 130. To be able to discriminate between different intrusion and nuisance events such as those described above, embodiments of the invention aim to provide a highly sensitive system that is capable of separating intrusion signals from system noise signals.

Figure 5:
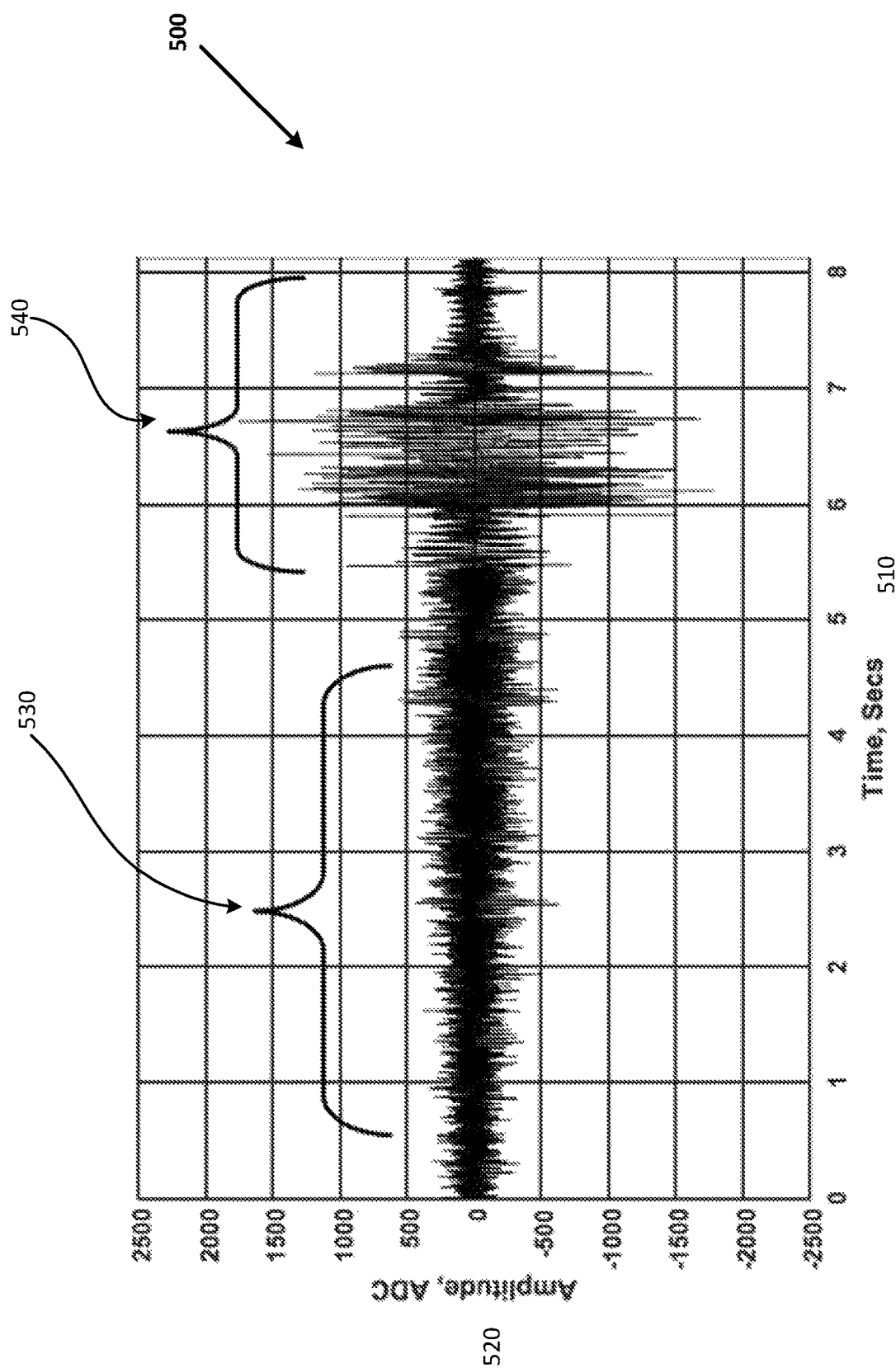
FIG. 5 shows an example of a perpendicular walk over a covert buried sensor.

FIG. 5 shows an example of walk intrusion data generated by a COTDR system such as that shown in FIG. 2 from a covert buried sensor by a perpendicular walk over the sensor. The example data was generated by having an "intruder" approach the buried sensor from a distance of 15 metres from the sensor location. In this example, the COTDR system 210 parameters were set to 200 ns pulse width and the sampling frequency was 2500 Hz. The data in FIG. 5 was a single bin from the time-space filtered data (Band pass filtered (BPF) between 15-1200 Hz) on the COTDR data representation domain. The location of this bin along 35 km sensor was 594 m and corresponded to the physical location where the "intruder" carried out the walk. As can be seen in FIG. 5 as time 510 elapsed the amplitude 520 varied. From the time domain data 500, it was clear that in section 530 of the signal the intruder's steps were buried inside the system noise as the intruder walked towards the sensor, whereas in section 540 the intruder's presence stands out from the background noise. Embodiments of the invention aim to provide a robust method that can detect these events even when they present inside the noise (e.g. in section 530). In some embodiments, this may enable an intruder's presence to be detected when they are further from the buried cable.

Figure 6:
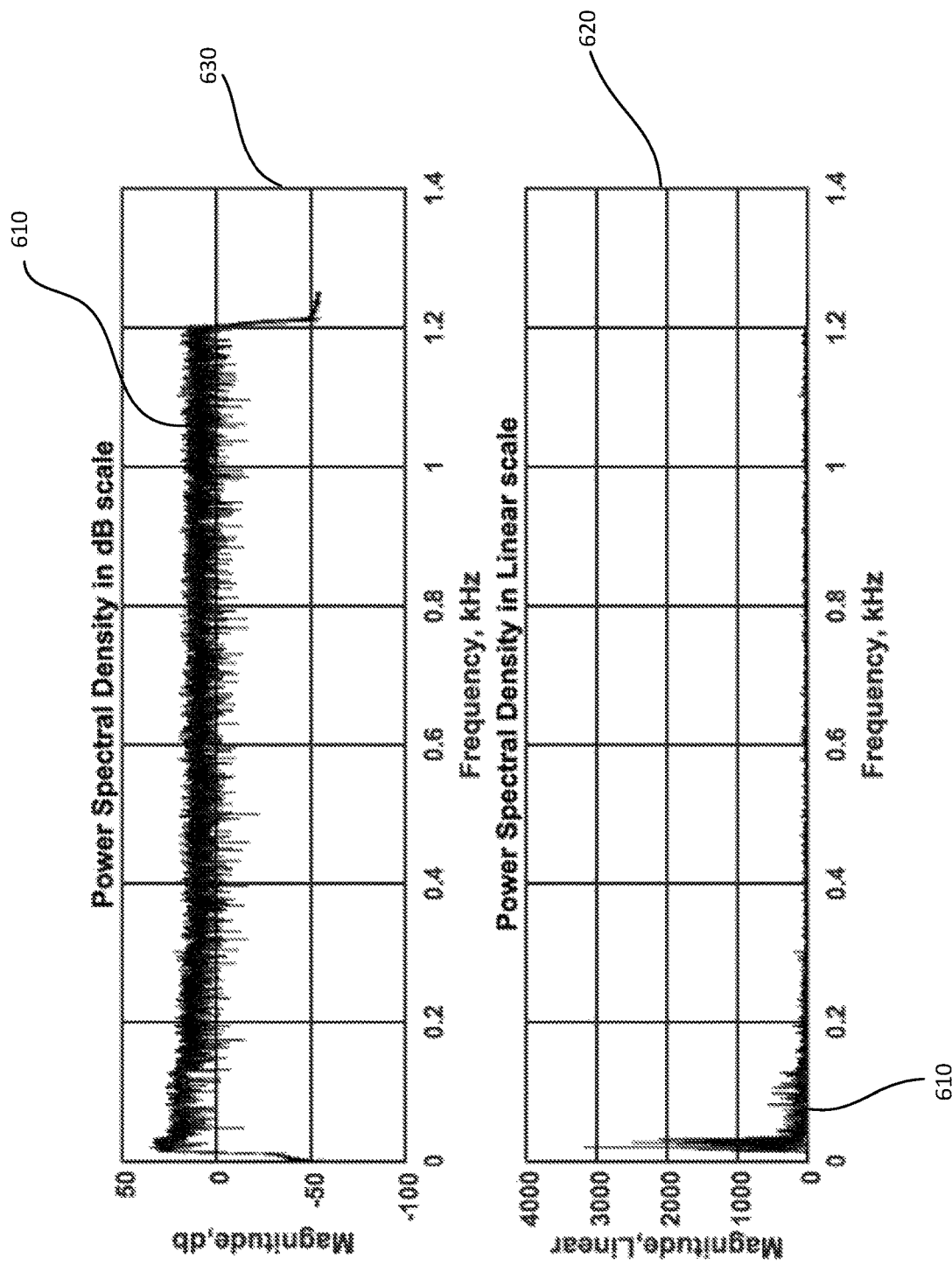
FIG. 6 shows the power spectral density of the signal in FIG. 5.

FIG. 6 shows the power spectral density 610 of the signal in FIG. 5 in linear 620 and in logarithmic scale 630. That is, it is a frequency-domain representation of walk intrusion data generated by COTDR system (signal in FIG. 5) in linear 620 and in dB 630 scale.

Figure 7:
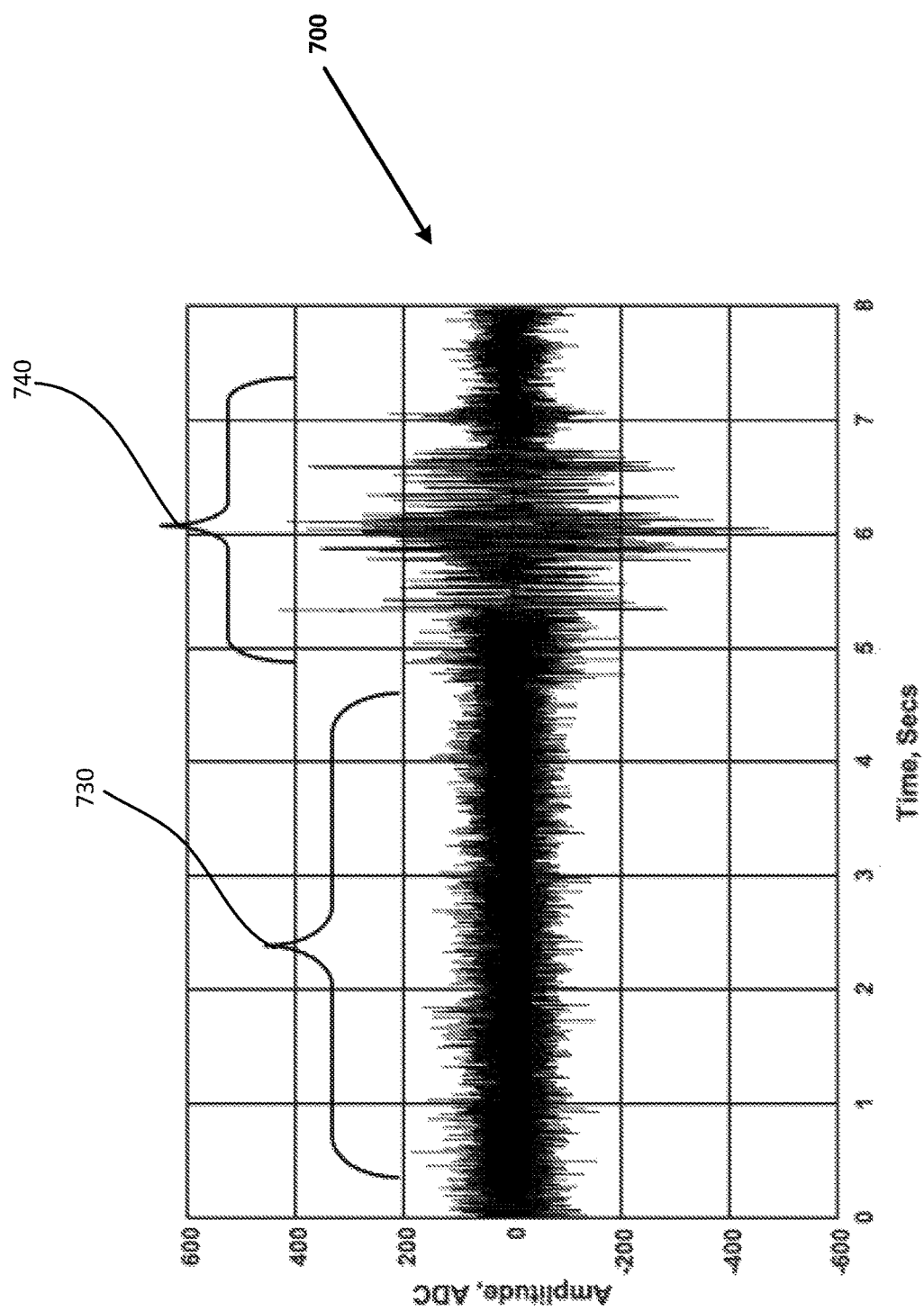
FIG. 7 shows another example of a perpendicular walk over a covert buried sensor.
Figure 8:
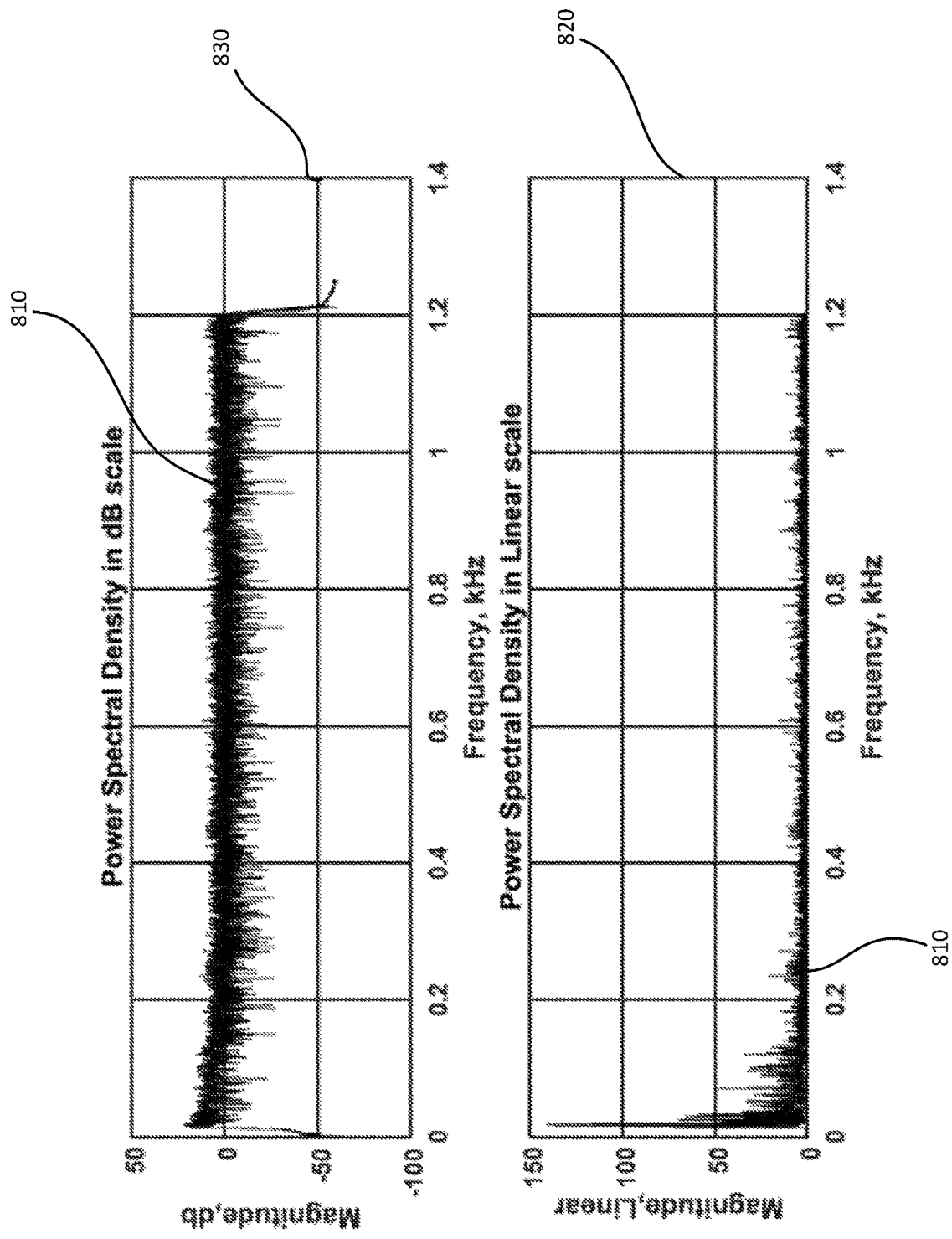
FIG. 8 shows the power spectral density of the signal in FIG. 7.

FIG. 7 shows another example of walk intrusion data generated by a perpendicular walk over a covert buried sensor. Again, the intruder approaches the buried sensor from a distance of 15 metres from the sensor location. The COTDR system 210 parameters were set to 200 ns pulse width and the sampling frequency was 2500 Hz. The data in FIG. 7 was a single bin from the time-space filtered data (BPF between 15-1200 Hz) on the COTDR data representation domain. The location of this bin was 32999 m along a 35 km sensor. From the time domain data 700, it is again clear that in section 730 of the signal the intruder's steps were buried inside the system noise as the intruder walked towards the sensor, whereas in section 740 the intruder's presence stands out from the background noise. FIG. 8 shows the power spectral density 810 of the signal in FIG. 7 in linear 820 and in logarithmic 830 scale.

Figure 9:
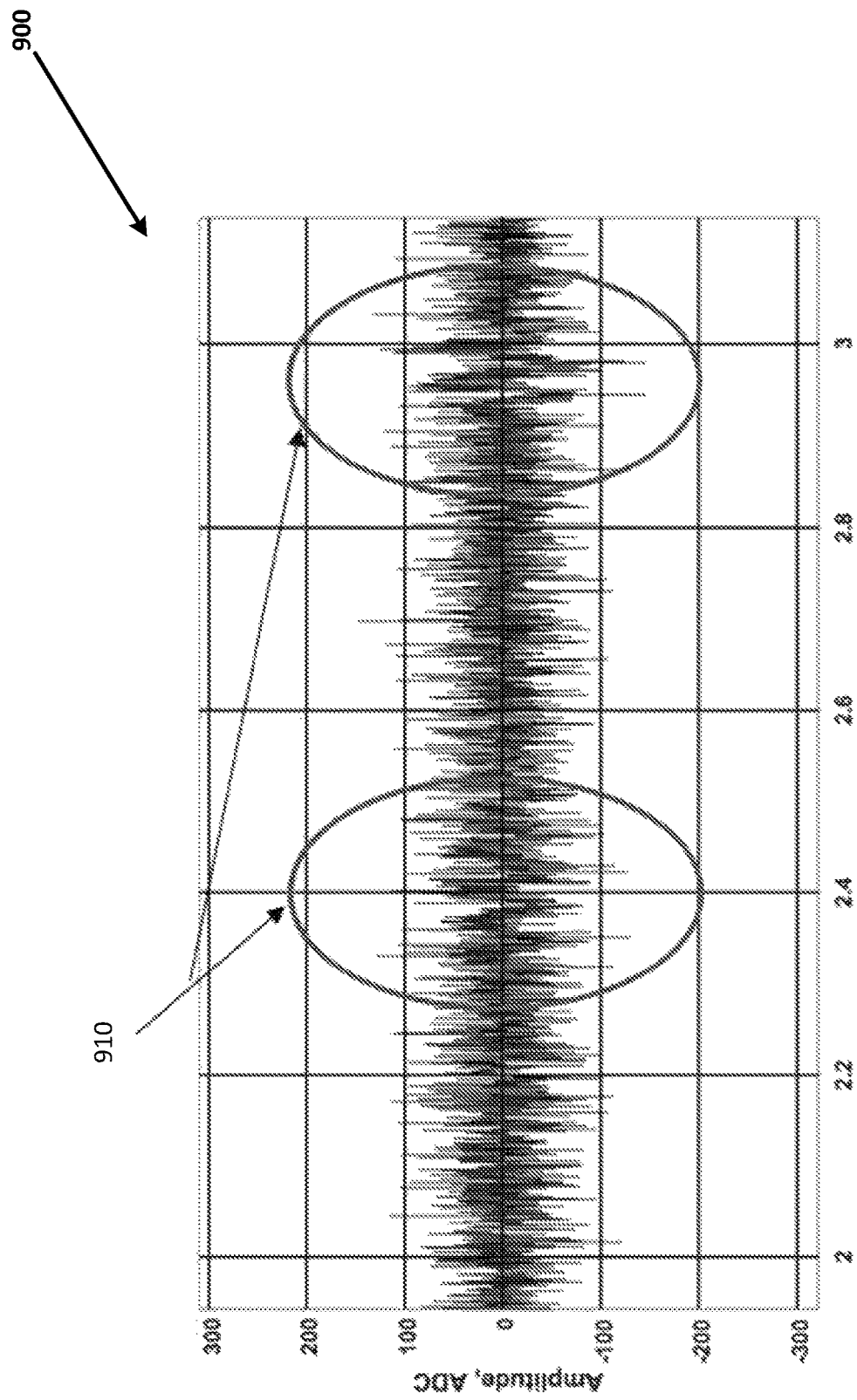
FIG. 9 shows a portion the time time-domain data in FIG. 7 between 2 seconds and 3 seconds.

FIG. 9 shows a portion 900 of time time-domain data in FIG. 7 between 2 seconds and 3 seconds. This figure shows that intruder steps 910 away were buried inside the noise. The proposed method has a capability to resolve these steps from the system noise.

Figure 10:
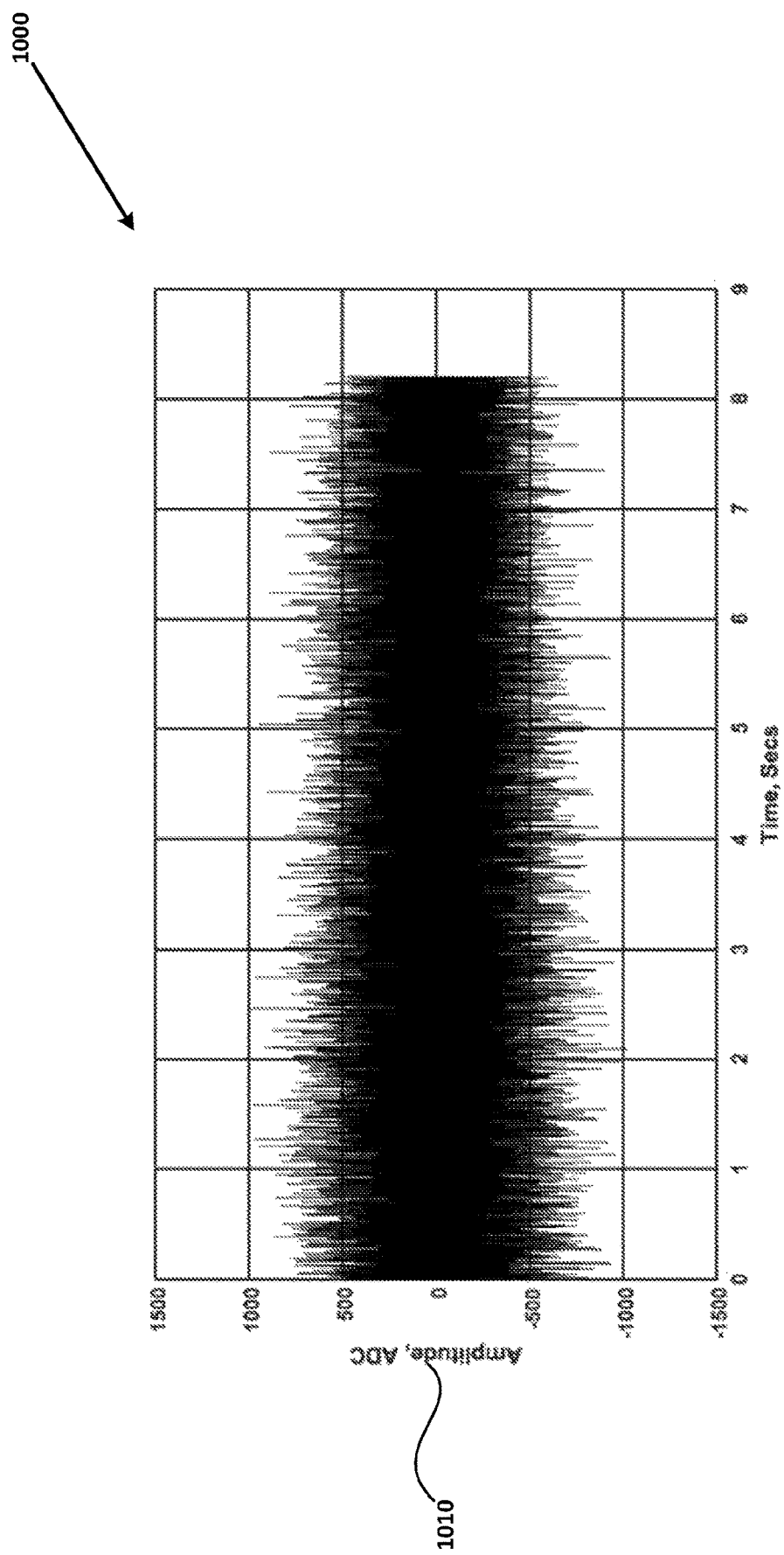
FIG. 10 shows an example of a system noise.
Figure 11:
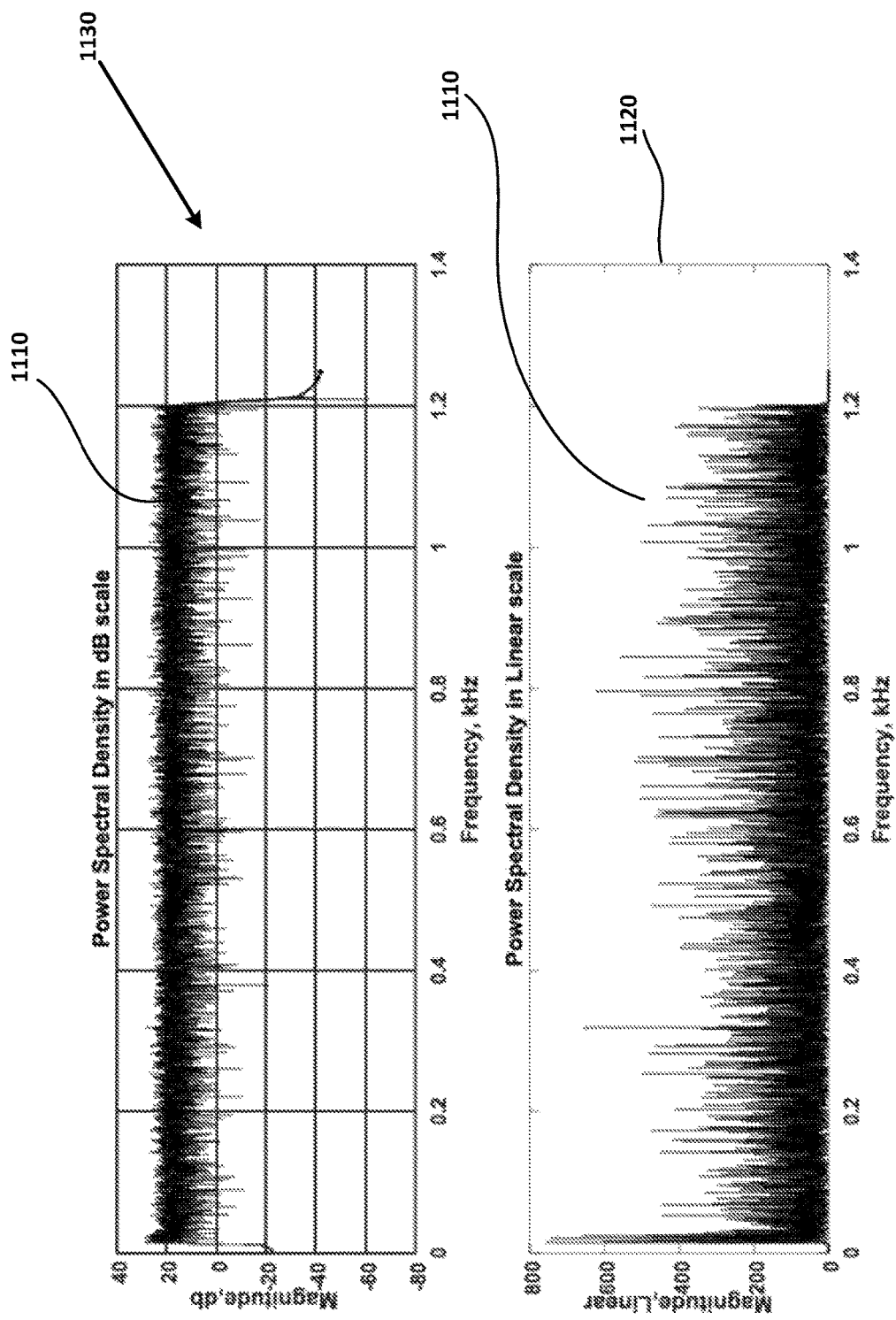
FIG. 11 shows the power spectral density of the signal in FIG. 10.

FIG. 10 shows an example of a system noise 1000 at bin location of 682 m along a 35 km covert buried sensor. The COTDR system parameters were set to 200 ns pulse width and the sampling frequency was 2500 Hz. The intensity (analog to digital conversion (ADC) values 1010) of the noise signal in this figure are comparable to the intensity resulting from intruder steps at a distance spaced from the sensor. FIG. 11 shows the power spectral density 1110 of the signal in FIG. 10 in linear 1120 and in logarithmic 1130 scale.

In some embodiments of the invention a frequency transformation method such as Fast Fourier Transform (FFT) or power spectral estimation method such as Welch is used to transform each location bin from the time domain to frequency domain such that each block of shots in each bin is represented by single pixel from the frequency domain representation of that bin. The Discrete Fourier Transform (DFT) of a finite length shots of length N on the Bin-Shot (space-time) space of the COTDR is defined as $$X[k] = \sum_{n=0}^{N-1} x[n] e^{-j\left(\frac{2\pi k n}{N}\right)}, k = 0, 1, \ldots N-1. \quad (1)$$

Figure 12:
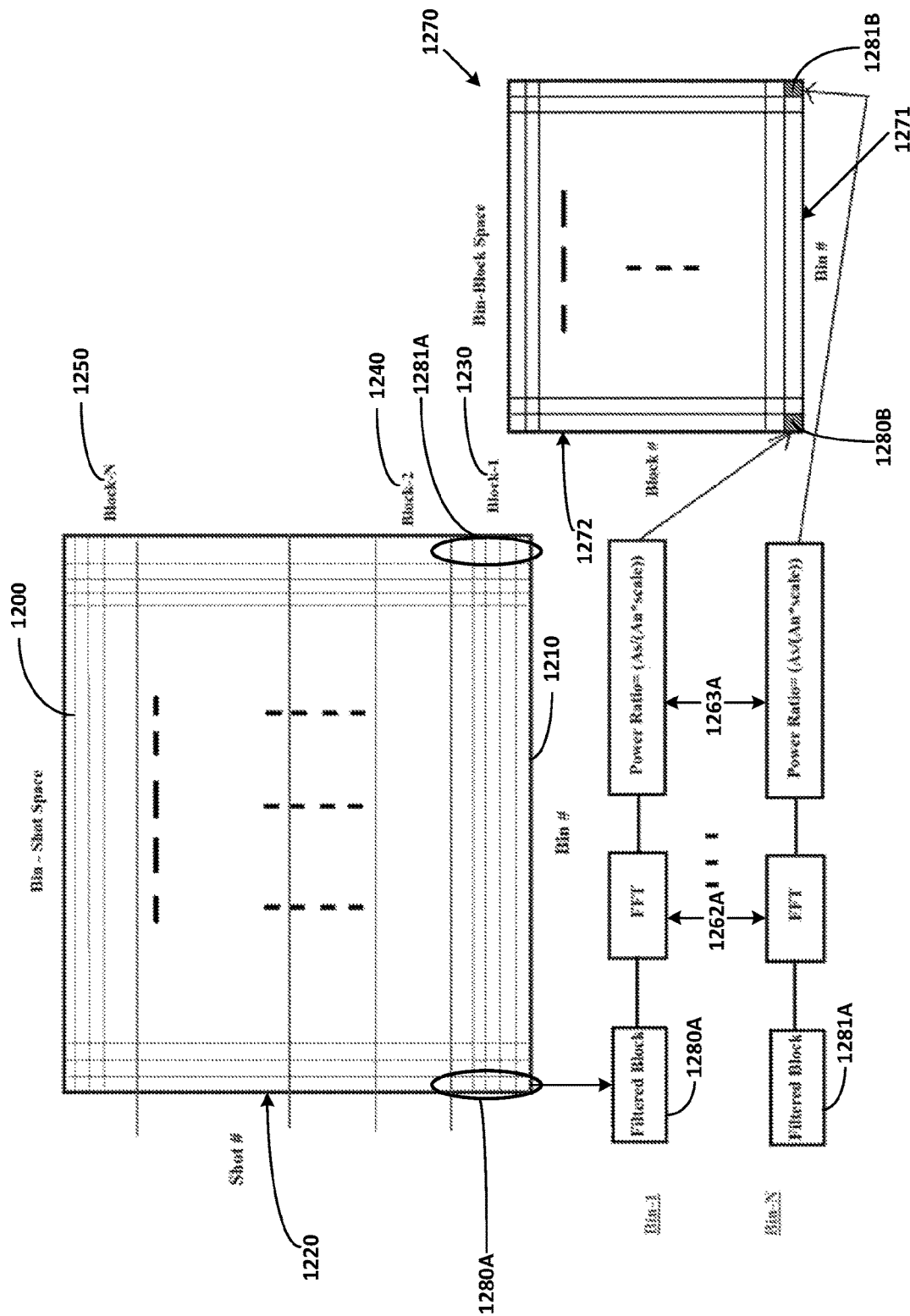
FIG. 12 is a schematic diagram of a process that can be used to generate the buried event detection statistic.
Figure 13:
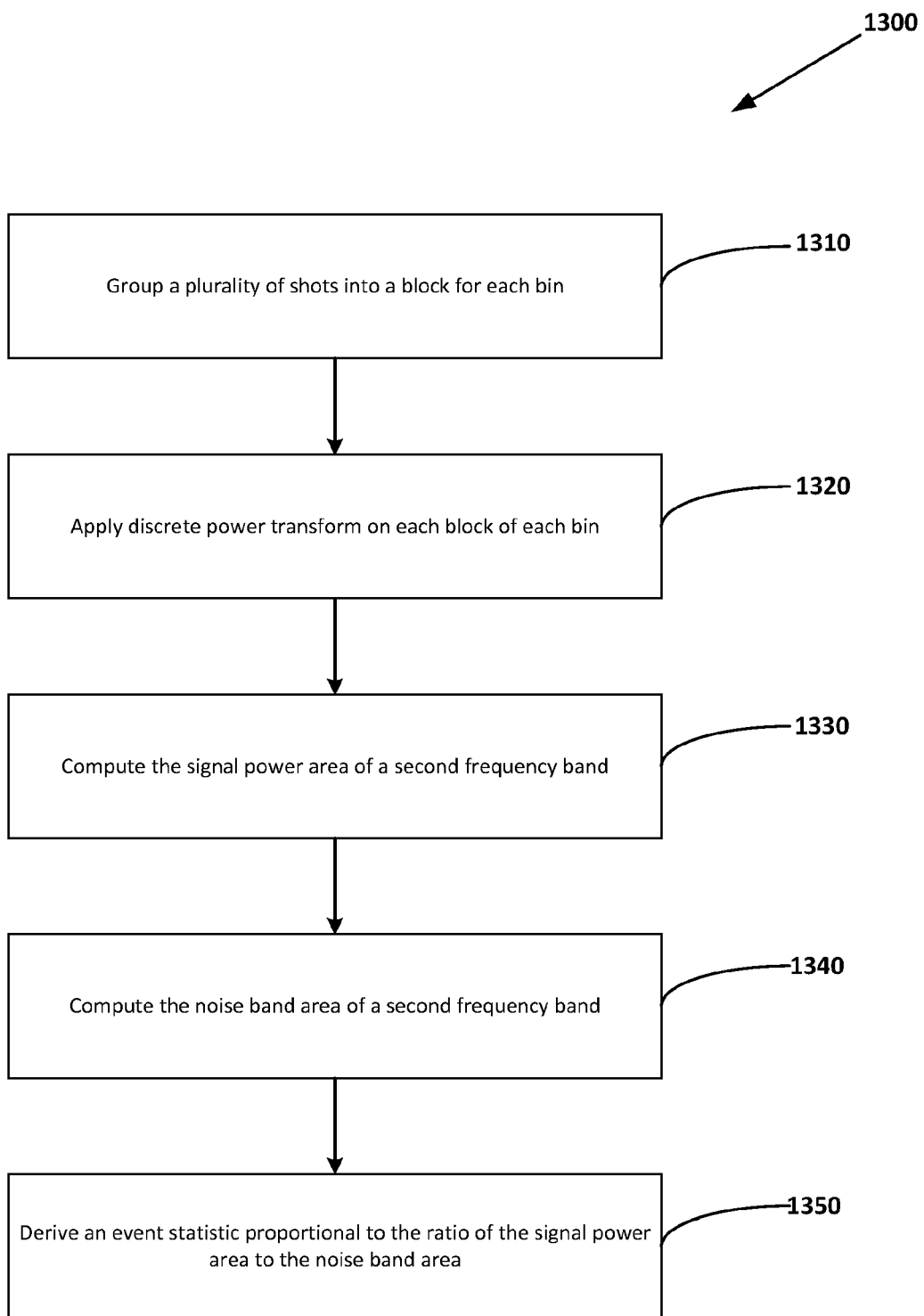
FIG. 13 is a flow chart of the process used to generate the buried event detection statistic.

FIG. 12 is a schematic diagram that illustrates a spectral analysis process 1300 of an embodiment for generating a buried event detection statistic and FIG. 13 is a flow chart of the process 1300. Referring to FIGS. 12 and 13, there is illustrated data collected by the COTDR in bin-shot space 1200. That is, the horizontal axis 1210 corresponds to the bins and the vertical axis 1220 corresponds to unique shots. At step 1310, for each bin of bin-1 to bin-N, data is collected from a plurality of shots to form a block so that there will be a plurality of blocks, block-1 1230, block-2 1240, . . . , block-N 1250. In an example, each block is formed from 400 shots. In an embodiment, once data of block has been collected, the data is processed. In other embodiments data of a plurality of blocks is collected before the data is processed.

The data of each bin is the bandpass filtered data (for example) as described above in connection with FIG. 4. Accordingly, the Fourier Transform will be applied to a filtered block of data, for example, for bin-1 the data from block of shots 1280A and for bin-N the block of shots 1281A.

At step 1320 a Discrete Fourier Transform process 1262 (DFT) is applied to each block to get a magnitude representation for each frequency bin from the high-pass filter frequency $f_1$ to $f_s/2$.

The method 1300 then employs two frequency bands in a process 1263 of calculating an event statistic from the frequency domain representation of the block. The first band is a signal band that includes frequency bins between $[f_1, f_2]$. The second band is a system noise band that is well away from signal band and is bounded by frequency between $[f_3, f_s/2]$. In other embodiments, event statistics can be calculated for multiple signal bands.

Figure 14:
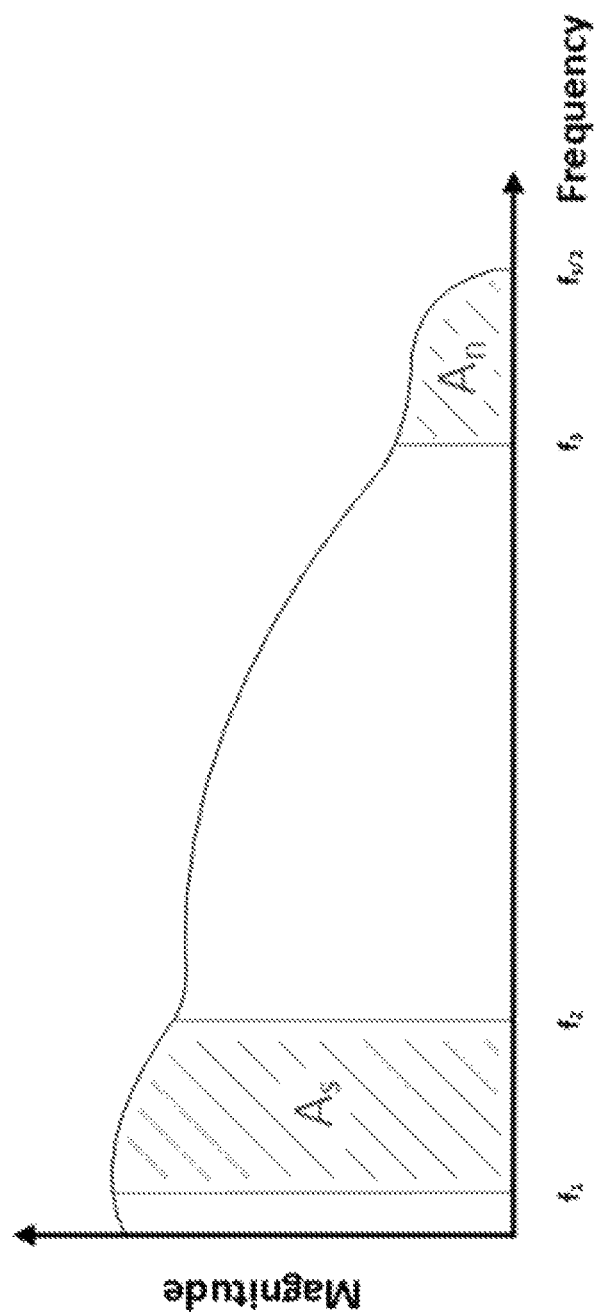
FIG. 14 shows example frequencies of interest.

At step 1330 the method involves computing the signal power area $A_s$ that is bounded by $[f_1, f_2]$ and at step 1340 the method involves computing the noise power area $A_n$ bounded by $[f_3, f_s/2]$. The areas $A_s$ and $A_n$ are shown in FIG. 14.

At step 1350 the method involves computing the event detection statistic using Equation 2 for each block to produce a bin-block representation 1270 of COTDR data as shown in FIG. 11.

$$PowerRatio = \frac{A_s}{(A_n \times \text{Scale})}, \quad (2)$$

where $$\text{Scale} = \frac{N_s}{N_n},$$

$N_s$ is the number of frequency bins in the signal band $[f_1, f_2]$ and $N_n$ is the number of frequency bins in the noise band $[f_3, f_s/2]$. In this respect, it will be appreciated that if the number of frequency bins is the same for each band, the scale factor is not needed.

That is, the horizontal axis 1271 of the bin-block representation 1270 represents bin-1 to bin-N and the vertical axis corresponds to the block number. For example, bin-block value 1280B has bin calculated from block of shots 1280A and bin-block value 1281B has been calculated from block of shots 1281A. Each value is represented in a colour space where the relative intensity of the colours are derived from the power ratio values. The colour space may be a grey-scale colour space or an RGB or CYMK colour space.

Figure 15:
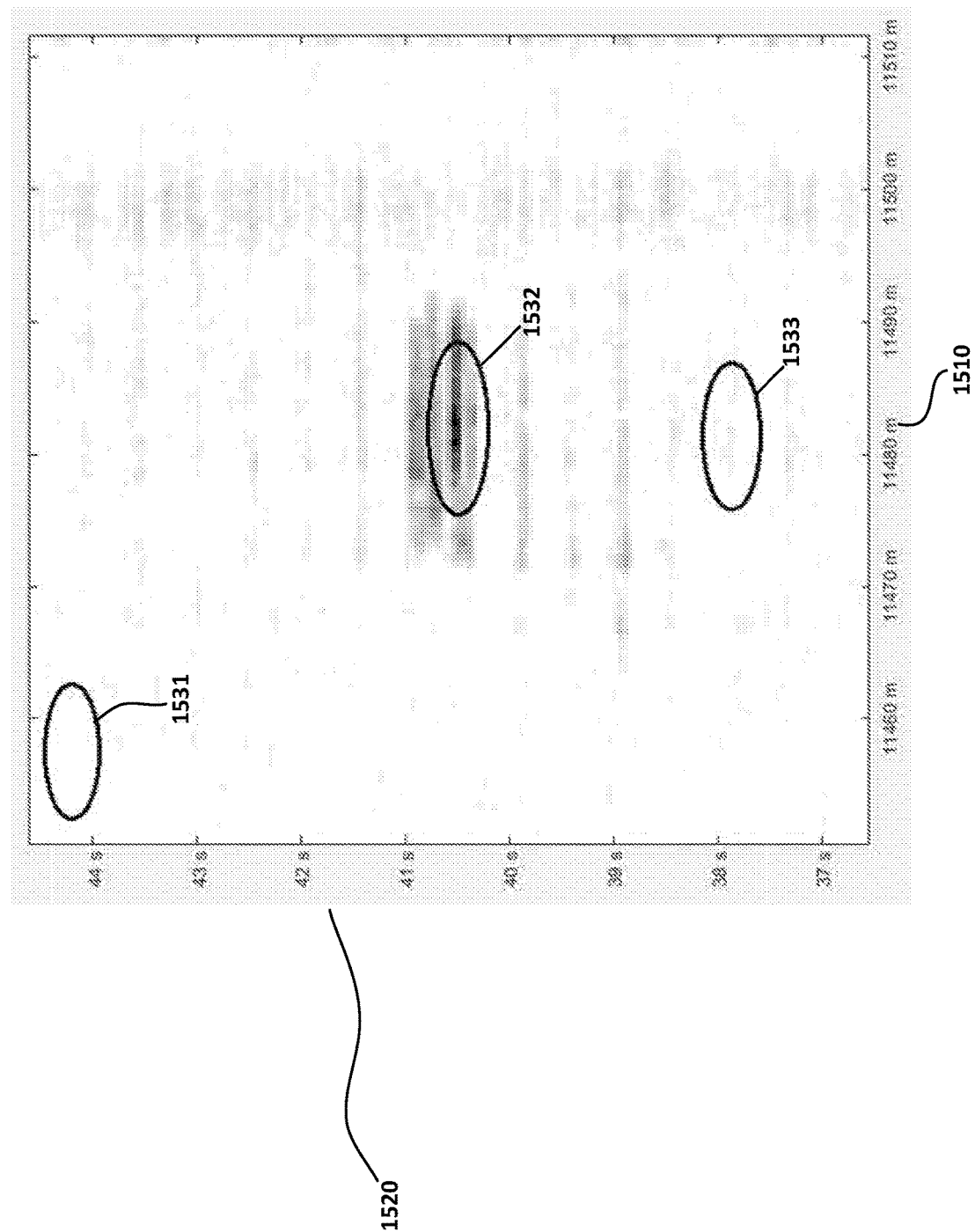
FIG. 15 shows an example location-block representation of a perpendicular walk over a covert buried sensor.

FIG. 15 shows a location-block representation (also known as a "waterfall" diagram) of a perpendicular walk at a cable distance of around 11.5 km over a covert buried sensor using the method of FIG. 13. Table 1 shows Power Ratio statistics for noise and intrusion steps data shown in the waterfall of FIG. 15. The statistical data was measured for a block of a single bin. The COTDR system 210 parameters were set to 200 ns pulse width and the sampling frequency was 2500 Hz. In this example, the scalar values of the power ratio are mapped to different grey scale values. In other examples, the power ratio values are mapped to different colours. That is, the horizontal axis 1510 represents location in metres and the vertical axis 1520 represents time in seconds. The intruder approaches the buried sensor from a distance of 15 metres from where the sensor is buried. The sensor length at this point is 11.48 km. The COTDR system parameters were set to 200 ns pulse width and the sampling frequency was 2500 Hz.

TABLE 1

| Signal data type | Power Ratio |
| --- | --- |
| Pure noise data 1531 | 1.24 |
| Step inside noise 1533 | 3.76 |
| Step on top of the buried sensor 1532 | 36.16 |

It will be apparent that system noise produces a power ratio close to unity. This is due to the fact that the system noise in this system is found to be white noise that has approximately similar intensity as different frequencies that make $A_s$ equivalent to $A_n$. Further, as the intrusion increases the power ratio starts to increase to a maximum on top of the sensor. In a buried application, intrusion data has significant frequency in the band less than 200 Hz for early detection. With gross intrusion such as digging, as the digging activity approaches a buried sensor cable the frequency band start to approach the Nyquist frequency. However, even during this scenario the low frequency band has much higher energy than the high frequency band.

In an example, the location-block representation can be monitored by a user on a display in order to determine the presence of an intruder. In another example, the data of the location-block-representation can be subjected to further processing to, for example, direct the user's attention to a particular part of the location-block representation or to generate an alarm. One example, is to apply a threshold to the statistic and treat values over the threshold as an event. In such an example, events in the same bin and/or neighbouring bins may be accumulated until there are sufficient of them to indicate a high probability that the individual events are not from nuisance events, at which point the collection of events is treated as a "trigger" and the user can be alerted or an alarm can be set off.

Figure 16:
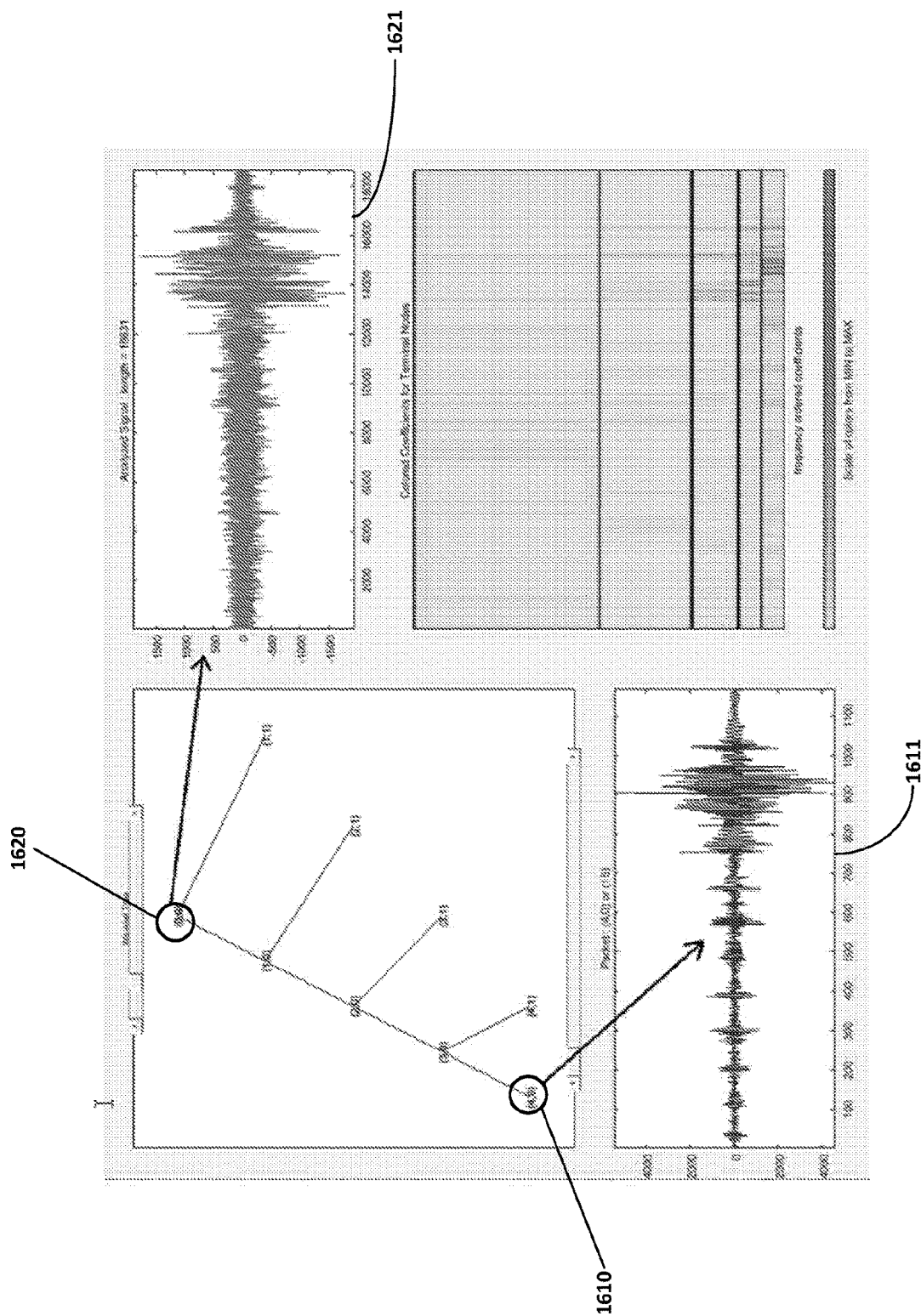
FIG. 16 is an example of using wavelet decomposition for a perpendicular walk over a covert buried sensor.
Figure 17:
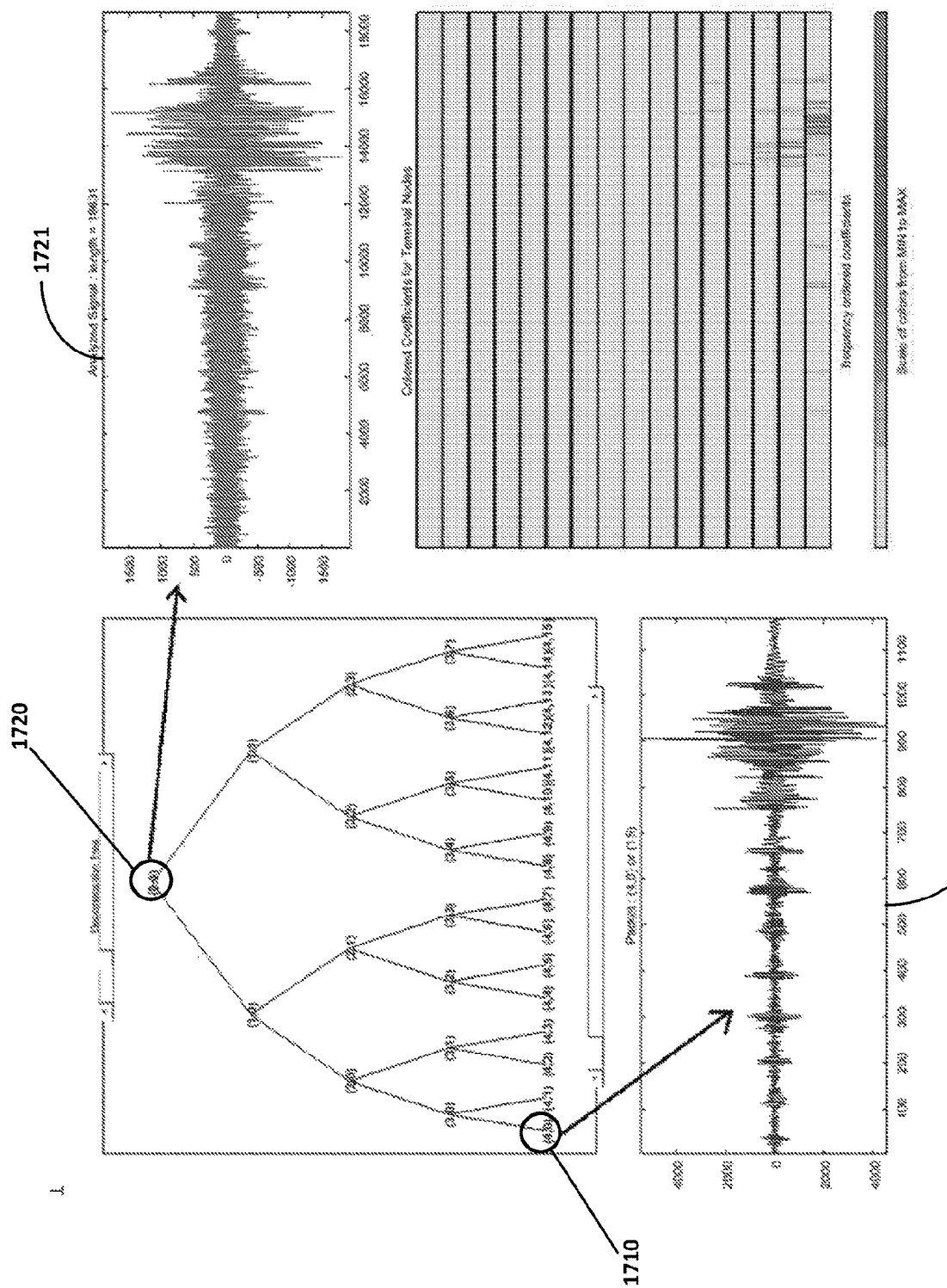
FIG. 17 is an example of using wavelet packet decomposition for a perpendicular walk over a covert buried sensor.

In an alternative embodiment, wavelet decomposition or wavelet packet transform is used to measure the power ratio between the intrusion signal and the system noise. Wavelet decomposition performs a multilevel one-dimensional wavelet analysis. In wavelet decomposition, filters of different cut-off frequencies are used to analyse the signal at different scales (frequencies). The signal is passed through a series of high pass filters (detail coefficients) to analyse the high frequencies, and it is passed through a series of low pass filters (approximation coefficients) to analyse the low frequencies. FIG. 16 shows the wavelet decomposition for a perpendicular walk over a covert buried sensor. The intruder approaches the buried sensor from a 15 metre distance from where the sensor is buried. The intrusion signal was decomposed at level 4. The difference between the wavelet decomposition and the wavelet packet is that the high pass filter bands of the wavelet decomposition in FIG. 16 (the detail coefficients) are divided into high pass and low pass to form the wavelet packet in FIG. 17.

Figure 18:
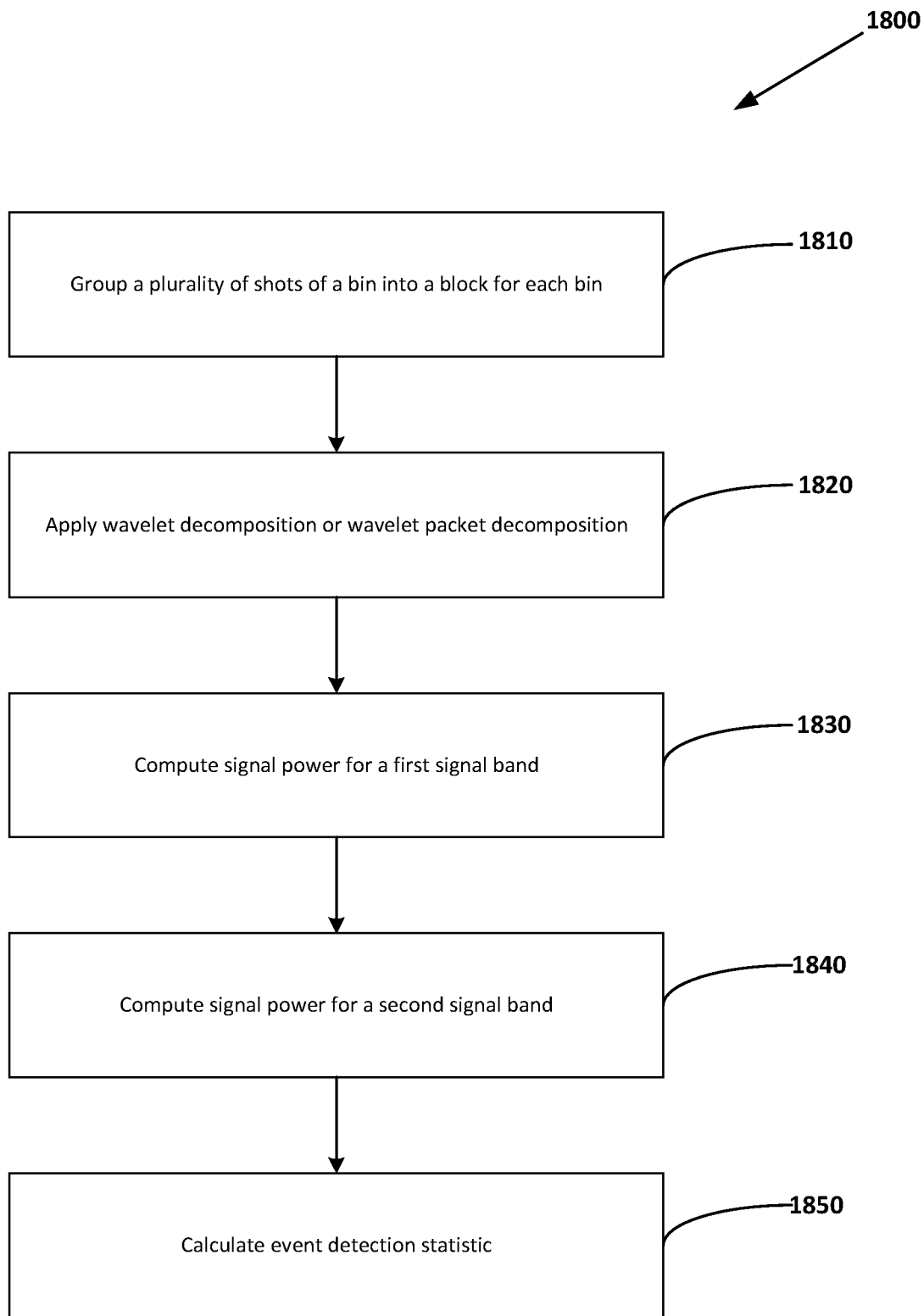
FIG. 18 is a flow chart of the process that can be used to generate the buried event detection statistic.

FIG. 18, illustrates a method 1800 of producing a buried detection statistic using wavelets. As in the method of FIG. 13, at step 1810, for each bin of bin-1 to bin-N, data is collected from a plurality of shots to form a block.

At step 1820, the method involves apply wavelet decomposition (FIG. 16) or wavelet packet decomposition (FIG. 17) at level J (in these examples we apply it at level 4 when the sampling frequency is 2500 Hz) on each block and get the energy 1611 from a node of low frequency (in the example of FIG. 16, the intrusion node (4,0) 1610) and the energy 1621 of system noise node with higher frequency (in this example was (1,1) 1620). (The example of FIG. 17, uses energy 1711 from a node of low frequency (node (4,0) 1710) and the energy 1721 of system noise node with higher frequency (in this example was (0,0) 1720).)

Referring to the example of FIG. 16, these two frequency bands (nodes) on the wavelet decomposition tree are used in an analogous manner to the frequency bands of the FFT method describe above. In this example, the first band is the signal band that from node (4,0) 1610. The second band is a system noise band that is well away from signal band and can be node (1,1) 1620.

At step 1830 the method involves computing the signal power area $A_s$ for the signal node and at step 1840, the method involves computing the noise power area $A_n$ for the noise node. In both cases, the signal power area is obtained by Parseval's theorem.

$$A_s = \sum_n^N |C(n)|^2 \qquad (3)$$

where C is the coefficient of each frequency band and N is the total number of samples of the signal in that node.

Step 1850 is the same as step 1350 in the method of FIG. 13 in that the event detection statistic is computed using the Equation 2 for each block to produce a bin-block representation of COTDR data.

Table 2 shows example Power Ratio statistics for noise and intrusion steps data from covert buried system using the wavelet decomposition method. The statistical data was measured for a block of a single bin data. The COTDR system parameters were set to 200 ns pulse width and the sampling frequency was 2500 Hz.

TABLE 2

Power ratio statistics for noise and intrusion steps from covert buried system using wavelet decomposition method

| Signal data type | Power Ratio |
| --- | --- |
| Pure noise data (e.g. data in FIG. 9) | 1.5944 |
| Step inside noise (e.g. FIG. 8) | 4.6032 |
| Step on top of the buried sensor | 67.2359 |

Some embodiments use multiple different frequency bands where separate event statistics are calculated separately for each of the two signal bands using one of the embodiments described above. As different frequencies are attenuated differently as they propagate through the ground. This can be indicative of the relative distance that these events occurred from the sensor. Accordingly, it can be advantageous to monitor multiple frequency bands and to employ triggers that use events from both bands either in addition to, or instead of, triggers that use events from one band.

Figure 19B:
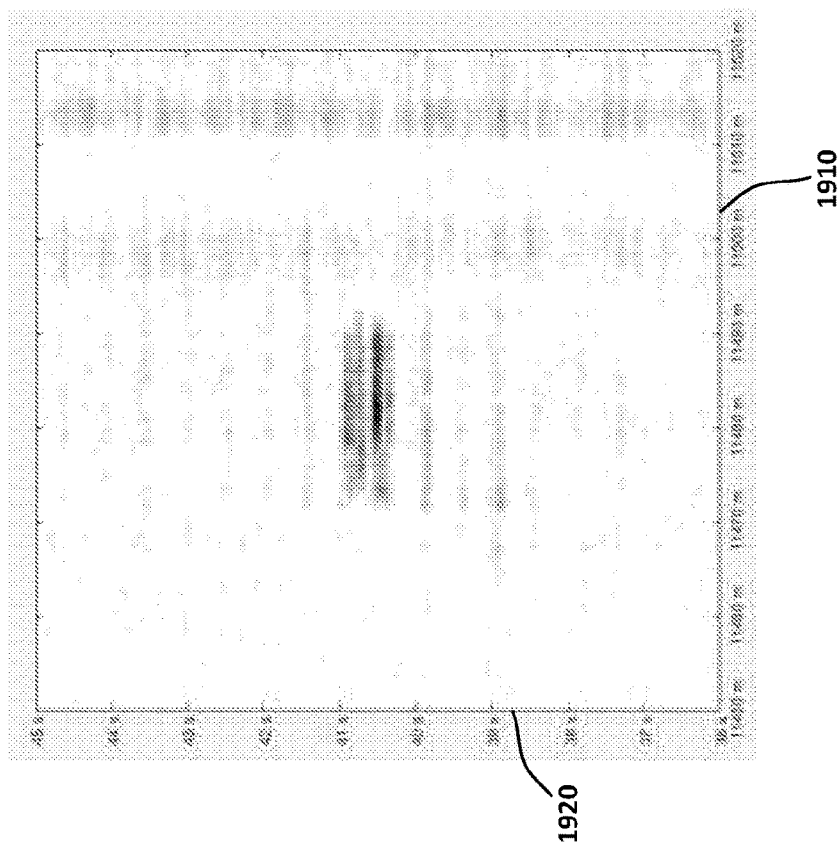
FIGS. 19A and 19B shows the signal generated from someone walking across the sensor for two different frequency bands.
Figure 19A:
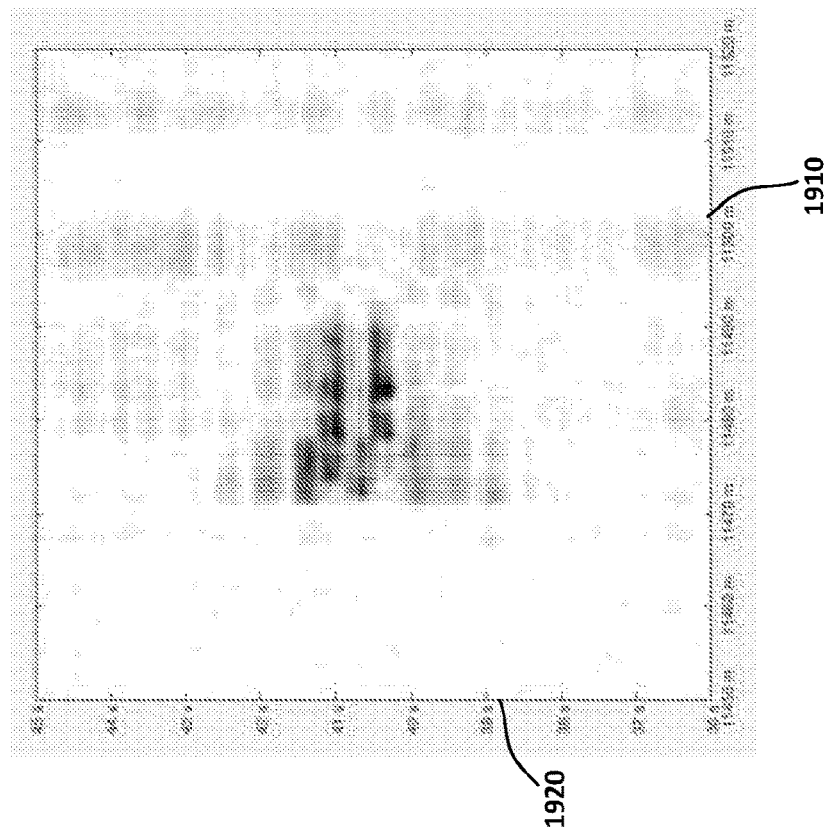

FIGS. 19A and 19B shows the signal generated from someone walking across the sensor for two different frequency bands. The horizontal axis 1910 is distance and the vertical axis 1920 is time. It this situation the signal observed at lower frequencies (2-5 Hz) as shown in FIG. 19A is much stronger than what is observed at frequencies between 20-40 Hz as shown in FIG. 19B. This results in more observable steps and giving a greater confidence that an intrusion has occurred. The 20-40 Hz band gives sharper temporal positioning making it easier to separate out individual steps.

Different types of events can also generate different frequencies and intensities, for example someone running generates stronger impacts and hence higher frequencies are more likely to be present. Someone walking slowly over the ground will be stepping more softly and will likely only generate lower frequencies.

Figure 20B:
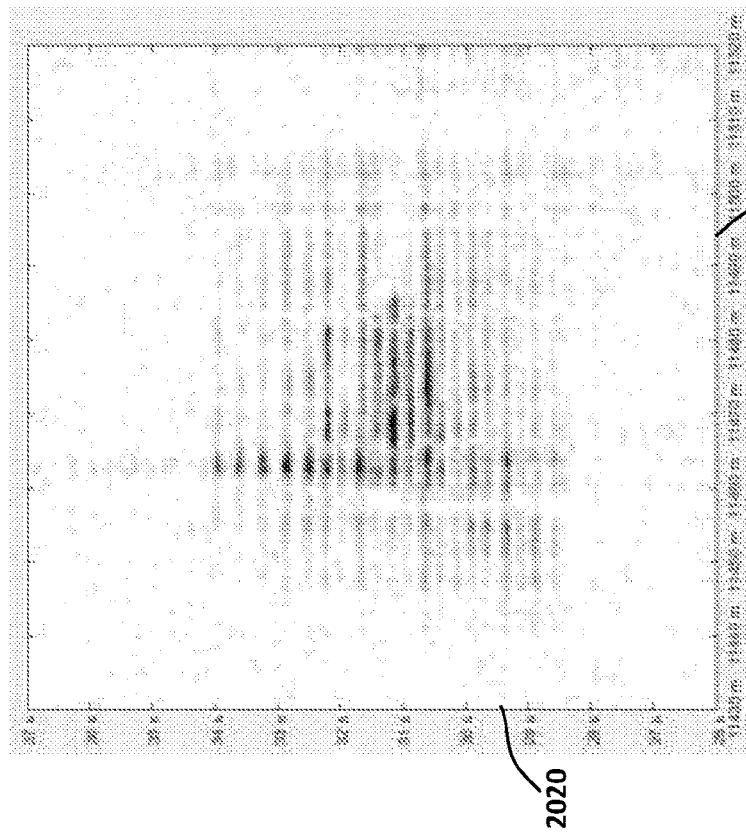
FIGS. 20A and 20B shows the signal generated from someone running across the sensor for two different frequency bands.
Figure 20A:
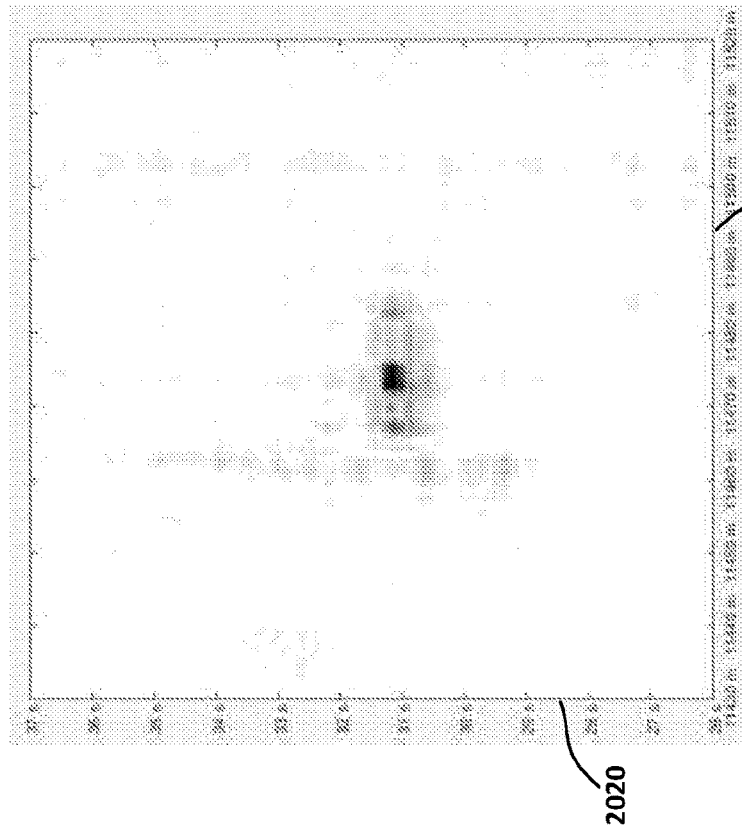

FIGS. 20A and 20B show a location-block representation of data gathered while someone was running across the sensor. The horizontal axis 2010 is distance and the vertical axis 2020 is time In this situation the 20-40 Hz frequency band (FIG. 20B) is better for identifying more steps. As the lower frequency band (FIG. 20A) only picks up footsteps within a few meters of the sensor it is suspected that there is greater attenuation of this frequency band through the soil. The differences in attenuation may also be attributed to the types of sound waves that produce these frequencies.

Figure 21:
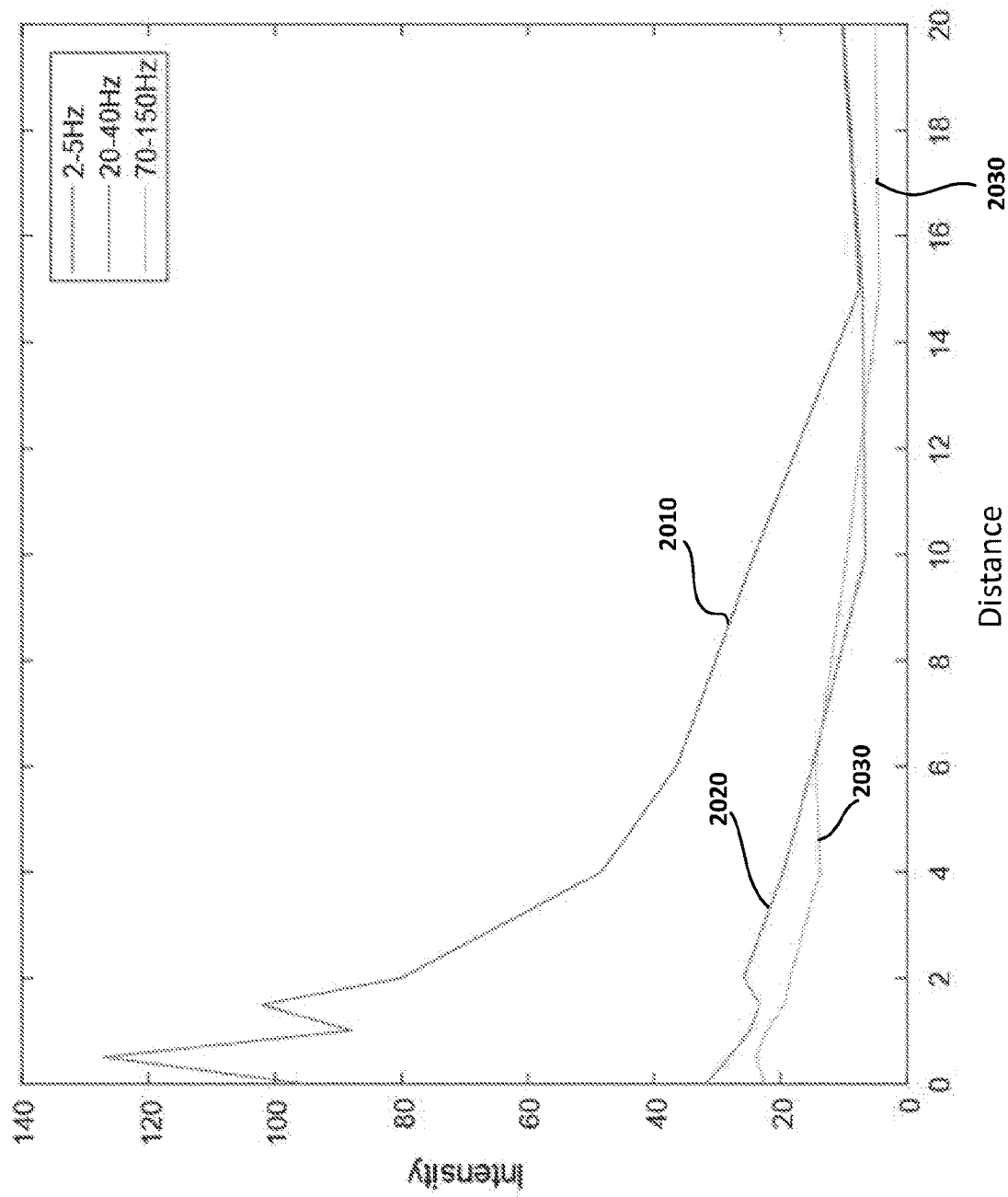
FIG. 21 gives a representation of the attenuation of different frequency bands.

FIG. 21 gives a representation of the attenuation of different frequency bands that are produced by dropping an 8 kg weight from a height of 1 meter. This plot shows attenuation for a first band 2010 from 2-5 Hz, a second band 2020 from 20-40 Hz and a third band 2030 from 70-150 Hz. The plot shows that the 20-40 Hz band 2020 has the lowest attenuation of the 3 bands displayed.

Figure 22:
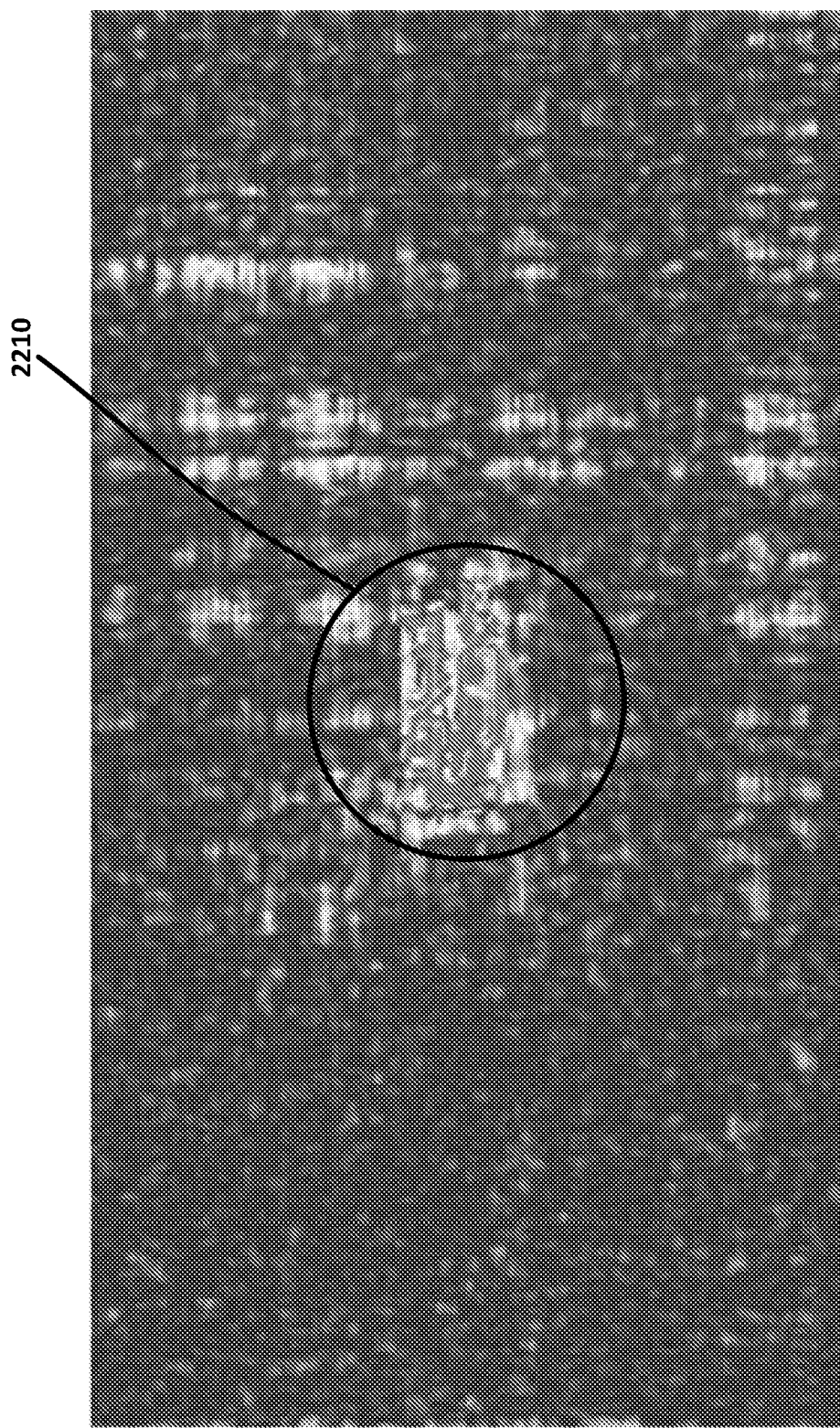
FIG. 22 is an example of events generated in a low frequency band.

An example of how multiple frequency bands can be used to improve intrusion detection is to flag potential alarms from a frequency band that is more sensitive to closer events such as the example shown in FIG. 22. In this case the 2-5 Hz frequency band has been used to find trigger events that are outlined in area 2210.

Figure 23:
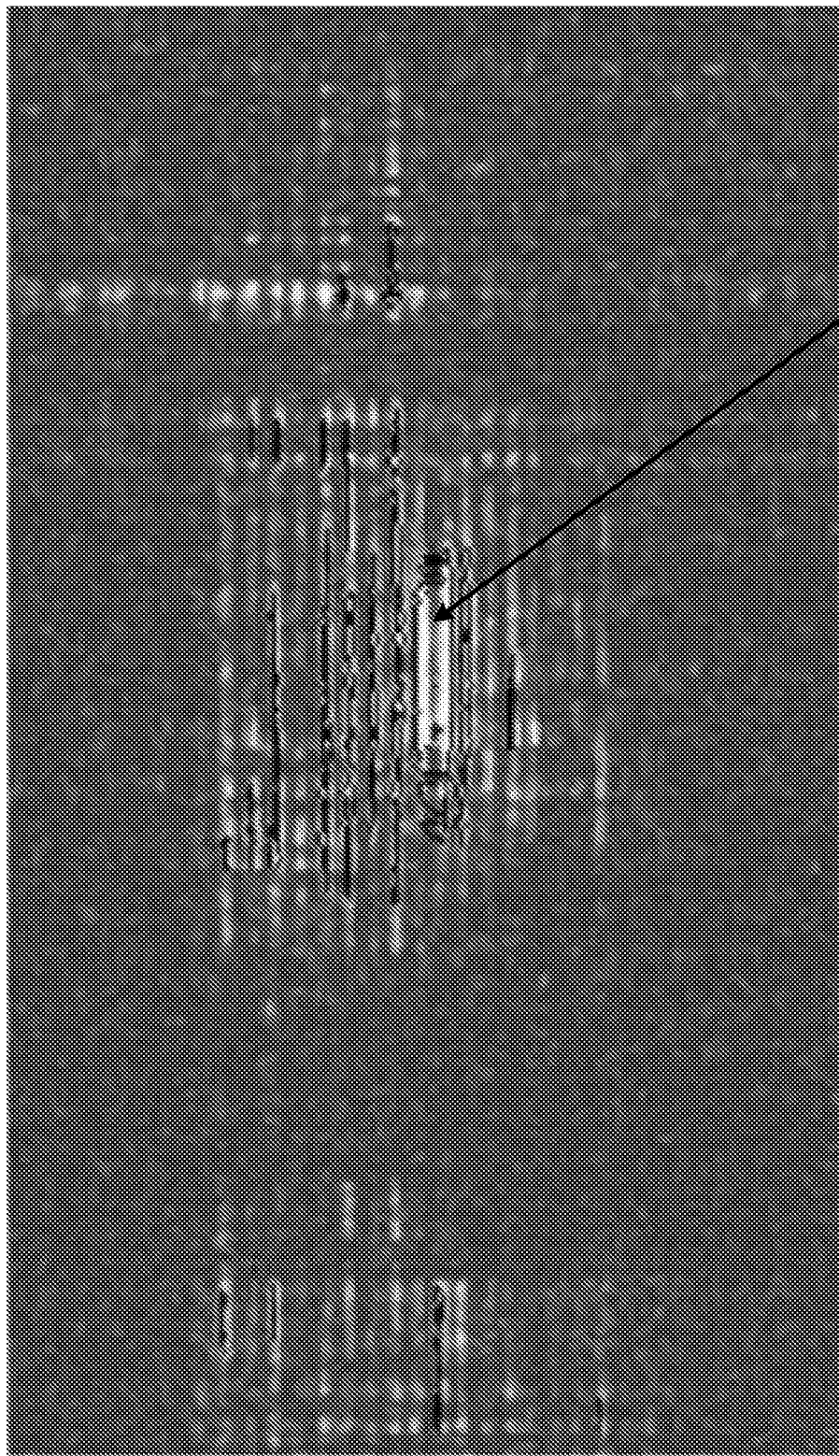
FIG. 23 is an example of events generated in a middle frequency band.

FIG. 23 shows events (e.g. 2310) generated from a middle frequency band (20-40 Hz), in this frequency band more events are likely to be detected further away from the sensor. This frequency can be better used to detect events that are associated with a potential intruder approaching the buried sensor. Higher frequencies also give sharper events that can separate out footsteps much easier.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A computer-implemented event statistic generation method for intrusion detection, comprising:
    processing a plurality of return signals from a coherent optical time domain reflectometer into time domain signals for each of a plurality of sensor bins, the plurality of return signals corresponding to a plurality of stimulation pulses injected into an optical sensor fiber during a time period; and
    for at least one sensor bin:
    transforming the respective time-domain signal into corresponding transform-domain coefficients of at least one transform-domain;
    calculating, from the respective decomposition-domain signal, a noise power of a noise transform-domain band expected to contain system noise;
    calculating, from the respective decomposition-domain signal, a plurality of signal powers, each for a unique signal transform-domain band expected to contain energy related to a detectable event; and
    for each signal power, generating an event statistic, wherein each event statistic is proportional to the ratio of its respective signal power to the noise signal power.

2. The method of claim 1, comprising processing a plurality of return signals for each of a plurality of time periods to obtain, for at least one sensor bin, a plurality of event statistics for each signal decomposition-domain band for each of the plurality of time periods.

3. The method of claim 1, wherein at least one transform-domain is a frequency domain, wherein the time-domain signal is transformed via a Fourier transform, and wherein the transform-domain coefficients are Fourier coefficients.

4. The method of claim 1, wherein at least one transform-domain is a wavelet domain, wherein the time-domain signal is transformed via wavelet decomposition or a wavelet packet transform, and wherein the transform-domain coefficients are wavelet coefficients.

5. The method of claim 4, wherein the wavelet decomposition or a wavelet packet transform generates a set of wavelet nodes, and wherein the noise transform-domain band corresponds to one or more first nodes and wherein the plurality of signal transform-domain bands correspond to a plurality of second nodes, wherein the second nodes are different to the first nodes.

6. The method of claim 5, wherein each signal transform-domain band is associated with a unique one of the second nodes.

7. The method of claim 1, wherein the signal transform-domain bands are selected such as to represent complementary signal information.

8. The method of claim 7, wherein at least one signal transform-domain band is selected to measure a first band and wherein at least one signal transform-domain band is selected to measure a second band non-overlapping with the first band, wherein the first band and second band correspond to vibrations detectable by the optical sensor fiber.

9. The method of claim 1, further comprising:
    for the at least one sensor bin:
    comparing relative values of at least two event statistics to characterize a type of measured event and/or measure a distance to a measured event.

10. An event statistic generation apparatus comprising:
    a processor; and
    a memory storing instructions which when executed by the processor, cause the processor to:
    process a plurality of return signals from a coherent optical time domain reflectometer into time domain signals for each of a plurality of sensor bins, the plurality of return signals corresponding to a plurality of stimulation pulses injected into an optical sensor fiber during a time period; and
    for at least one sensor bin:
    transform the respective time-domain signal into corresponding transform-domain coefficients of at least one transform-domain;

calculate, from the respective decomposition-domain signal, a noise power of a noise transform-domain band expected to contain system noise;

calculate, from the respective decomposition-domain signal, a plurality of signal powers, each for a unique signal transform-domain band expected to contain energy related to a detectable event; and for each signal power, generate an event statistic, wherein each event statistic is proportional to the ratio of its respective signal power to the noise signal power.

11. The apparatus of claim 10, wherein when the instructions are executed by the processor cause the processor to process a plurality of return signals for each of a plurality of time periods to obtain, at least one sensor bin, a plurality of event statistics for each signal decomposition-domain band for each of the plurality of time periods.

12. The apparatus of claim 10, wherein at least one transform-domain is a frequency domain, wherein the time-domain signal is transformed via a Fourier transform, and wherein the transform-domain coefficients are Fourier coefficients.

13. The apparatus of claim 10, wherein at least one transform-domain is a wavelet domain, wherein the time-domain signal is transformed via wavelet decomposition or a wavelet packet transform, and wherein the transform-domain coefficients are wavelet coefficients.

14. The apparatus of claim 13, wherein the wavelet decomposition or a wavelet packet transform generates a set of wavelet nodes, and wherein the noise transform-domain band corresponds to one or more first nodes and wherein the plurality of signal transform-domain bands correspond to a plurality of second nodes, wherein the second nodes are different to the first nodes.

15. The apparatus of claim 14, wherein each signal transform-domain band is associated with a unique one of the second nodes.

16. The apparatus of claim 10, wherein the signal transform-domain bands are selected such as to represent complementary signal information.

17. The apparatus of claim 16, wherein at least one signal transform-domain band is selected to measure a first band and wherein at least one signal transform-domain band is selected to measure a second band non-overlapping with the first band, wherein the first band and second band correspond to vibrations detectable by the optical sensor fiber.

18. The apparatus of claim 10, further comprising:
for the at least one sensor bin:
comparing relative values of at least two event statistics to characterize a type of measured event and/or measure a distance to a measured event.

19. A computer-implemented event statistic generation method for intrusion detection comprising:

processing a plurality of return signals from a coherent optical time domain reflectometer into time domain signals for each of a plurality of sensor bins, the plurality of return signals corresponding to a plurality of stimulation pulses injected into an optical sensor fiber during a time period; and for at least one sensor bin:

transforming the respective time-domain signal into a corresponding wavelet-domain signal;

calculating, from the respective wavelet-domain signal, a first signal power of a first band expected to contain system noise;

calculating, from the respective wavelet-domain signal, a second power of a second band expected to contain energy related to at least a first event; and generating an event statistic proportional to the ratio of the second signal power to the first signal power at least in part by dividing the second signal power by the first signal power.

20. An event statistic generation apparatus comprising:
a processor; and
a memory storing instructions which when executed by the processor, cause the processor to:

process a plurality of return signals from a coherent optical time domain reflectometer into time domain signals for each of a plurality of sensor bins, the plurality of return signals corresponding to a plurality of stimulation pulses injected into an optical sensor fiber during a time period; and for at least one sensor bin:

transform the respective time-domain signal into a corresponding wavelet-domain signal;

calculate, from the respective wavelet-domain signal, a first signal power of a first band expected to contain system noise;

calculate, from the wavelet-domain signal, a second signal power of a second band expected to contain energy related to at least a first event; and generate an event statistic proportional to the ratio of the second signal power to the first signal power at least in part by dividing the second signal power by the first signal power.

* * * * *